(12) United States Patent
Beer et al.

(10) Patent No.: US 10,894,667 B2
(45) Date of Patent: Jan. 19, 2021

(54) CONTAINER FOR THE INDIVIDUAL RELEASE OF BULK MATERIAL AND METHOD OF OPERATION WITH A TRANSPORT ROBOT OR A LONGITUDINAL CONVEYOR

(71) Applicant: Servus Intralogistics GmbH, Dornbirn (AT)

(72) Inventors: Christian Beer, Schwarzach (AT); Wolfgang Braendle, Hohenems (AT)

(73) Assignee: HERON INNOVATIONS FACTORY GMBH, Dornbirn (DE)

( * ) Notice: Subject to any disclaimer, the term of this patent is extended or adjusted under 35 U.S.C. 154(b) by 251 days.

(21) Appl. No.: 15/958,195

(22) Filed: Apr. 20, 2018

(65) Prior Publication Data

US 2018/0346255 A1  Dec. 6, 2018

(30) Foreign Application Priority Data

Jun. 2, 2017 (DE) .................. 10 2017 005 261

(51) Int. Cl.
| | | |
|---|---|---|
| *B65B 3/04* | (2006.01) | |
| *B65G 35/06* | (2006.01) | |
| *B65D 43/20* | (2006.01) | |
| *B65G 3/04* | (2006.01) | |
| *B65D 25/38* | (2006.01) | |
| *B65G 65/00* | (2006.01) | |

(Continued)

(52) U.S. Cl.
CPC ............ *B65G 35/06* (2013.01); *B65D 25/38* (2013.01); *B65D 43/20* (2013.01); *B65G 1/0492* (2013.01); *B65G 3/04* (2013.01); *B65G 47/96* (2013.01); *B65G 65/00* (2013.01); *B65D 25/04* (2013.01); *B65G 2814/0323* (2013.01)

(58) Field of Classification Search
CPC .. B65G 17/123; B65G 1/1378; B65G 1/0471; B65G 1/0492; B65G 35/06; B65G 2814/0323
See application file for complete search history.

(56) References Cited

U.S. PATENT DOCUMENTS

| | | | |
|---|---|---|---|
| 8,770,385 B2 * | 7/2014 | Hannessen ........... | B65G 17/123 198/607 |
| 9,371,183 B2 * | 6/2016 | Toebes ..................... | B65G 1/04 |

(Continued)

FOREIGN PATENT DOCUMENTS

| | | |
|---|---|---|
| DE | 3236471 A1 | 4/1984 |
| DE | 102015218380 A1 | 3/2017 |

(Continued)

*Primary Examiner* — Reinaldo Sanchez-Medina
(74) *Attorney, Agent, or Firm* — Browdy and Neimark, PLLC

(57) ABSTRACT

A rail-bound transport robot having an approximately box-like container, which is open at the top, for individual release of bulk material, which is provided in its inner space with at least one compartment, which is filled with the bulk material, wherein the transport robot has a loading space open at the top, adapted for receiving the container, and wherein the container rests on a longitudinal conveyor in the transport robot, which engages opening lids from below, which are positioned on the bottom side of container, wherein the bulk material flows outwardly through the opening lids, when the opening lids are opened.

12 Claims, 20 Drawing Sheets

(51) Int. Cl.
*B65G 1/04* (2006.01)
*B65G 47/96* (2006.01)
*B65D 25/04* (2006.01)

(56) References Cited

U.S. PATENT DOCUMENTS

| | | | |
|---|---|---|---|
| 2009/0026041 A1* | 1/2009 | Schaefer | B65G 1/133 198/456 |
| 2012/0245728 A1 | 9/2012 | Koholka | |
| 2016/0104099 A1* | 4/2016 | Villamar | G06Q 50/28 705/26.81 |
| 2016/0280461 A1* | 9/2016 | Geiger | B65G 1/1373 |
| 2018/0105370 A1* | 4/2018 | Philipp | B65G 47/57 |

FOREIGN PATENT DOCUMENTS

| | | |
|---|---|---|
| EP | 2826731 A1 | 1/2015 |
| JP | 60-167825 A | 8/1985 |

* cited by examiner

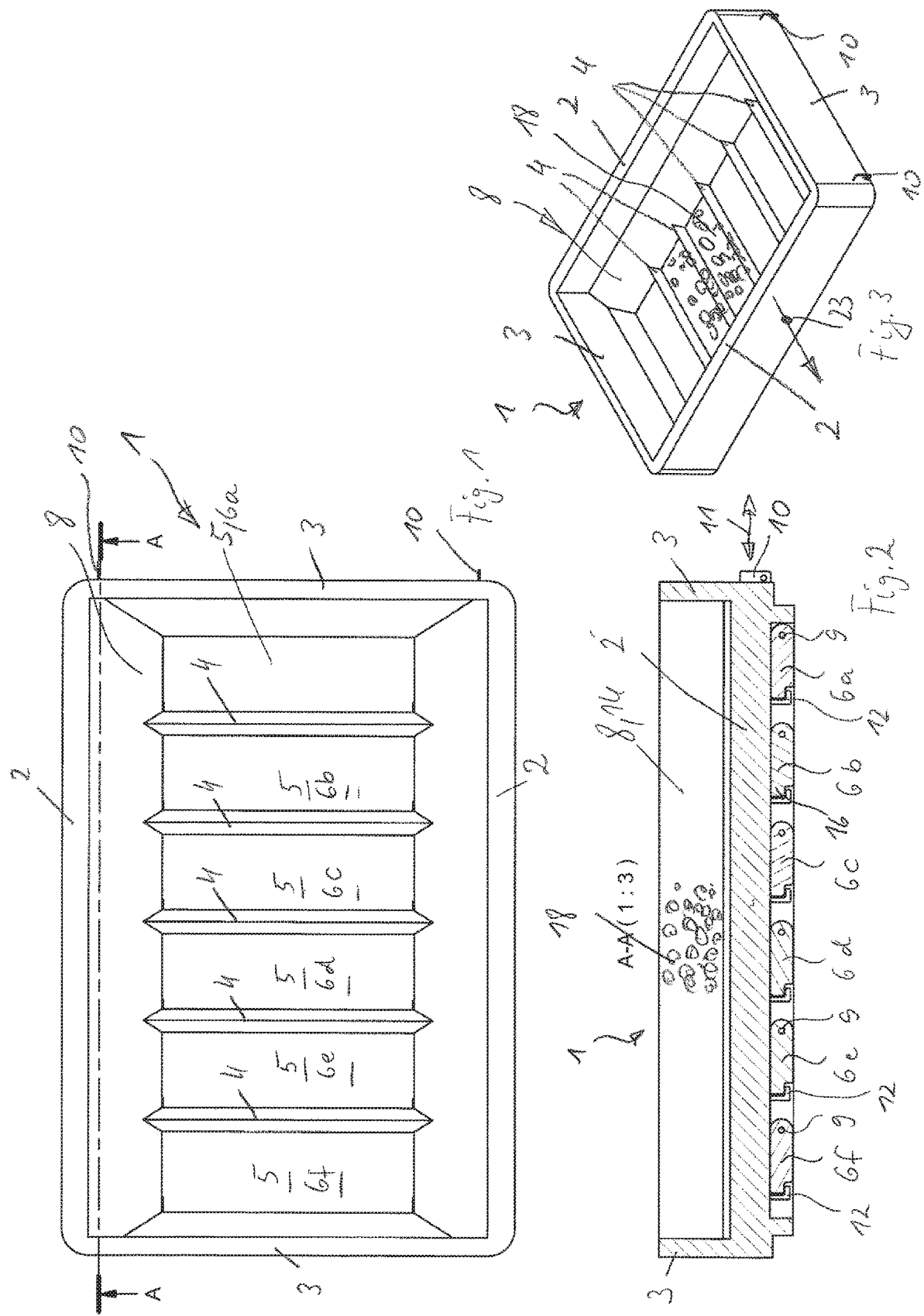

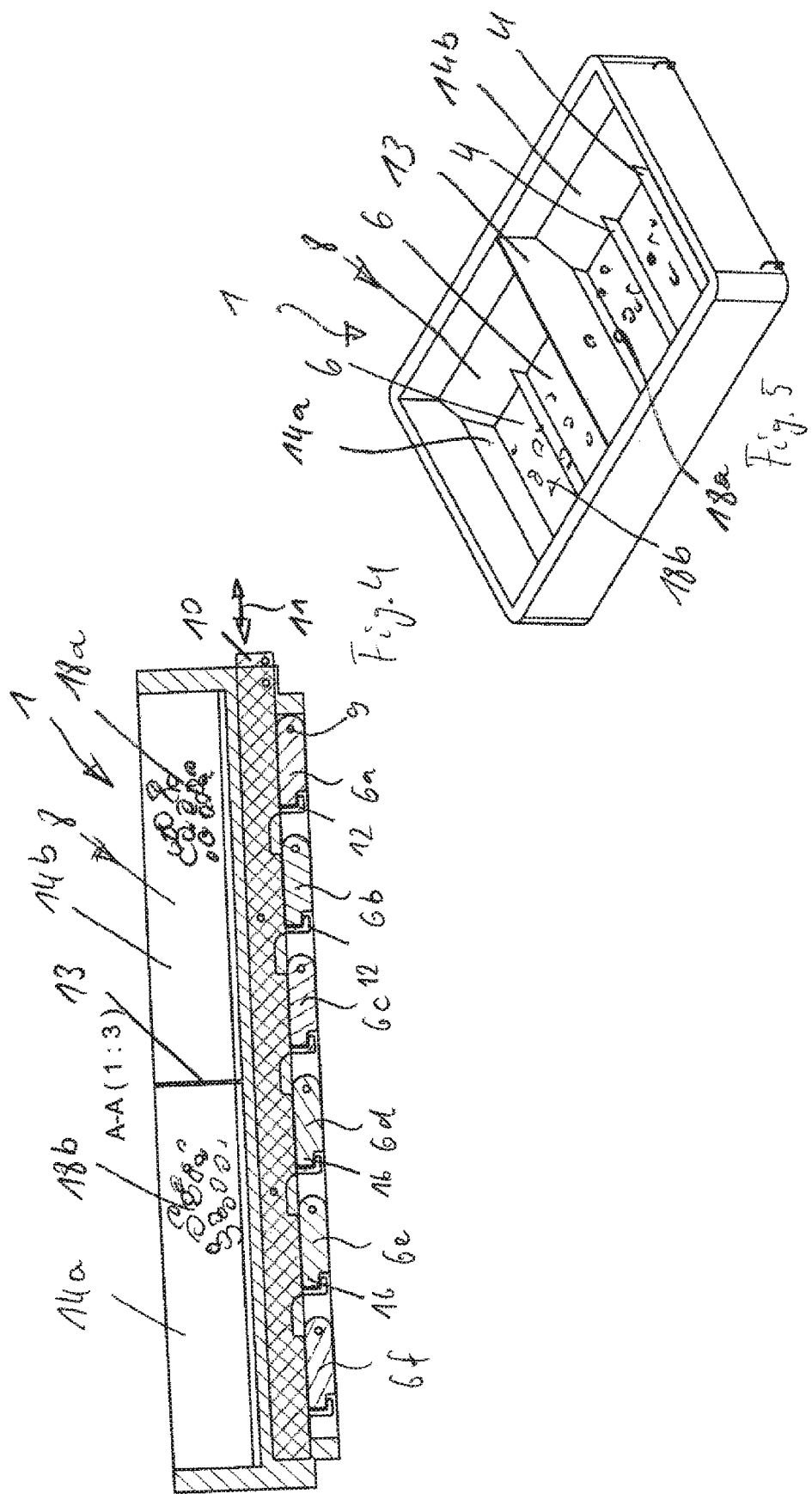

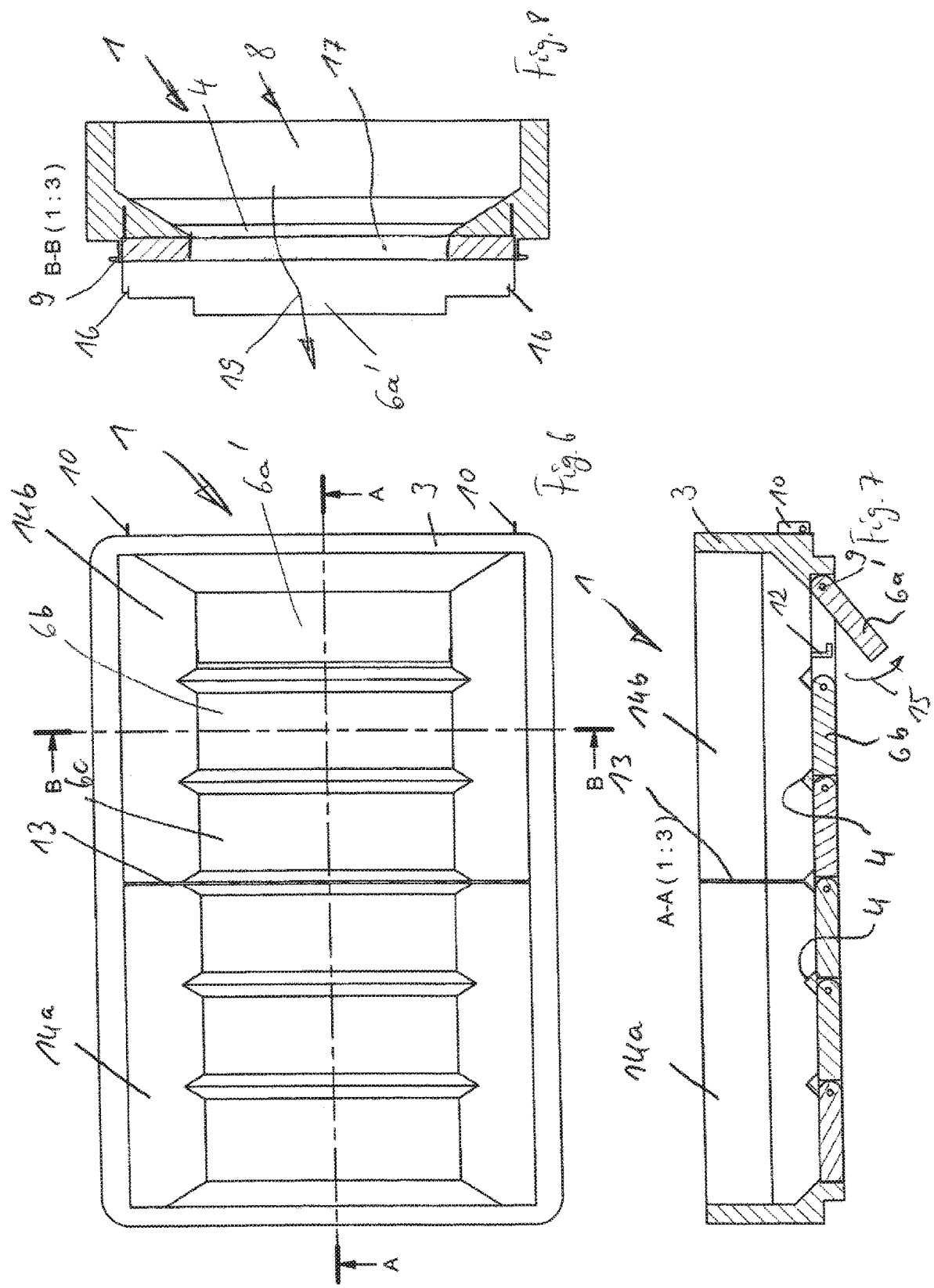

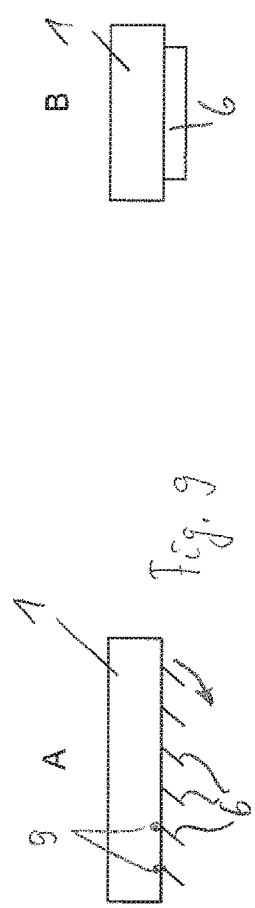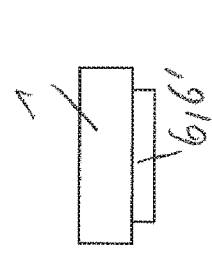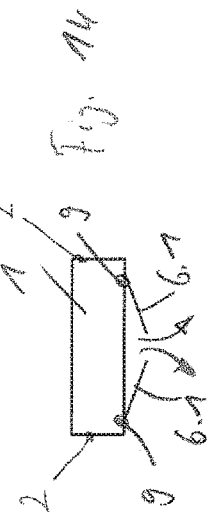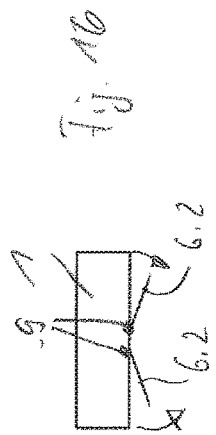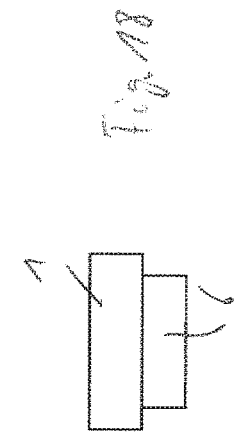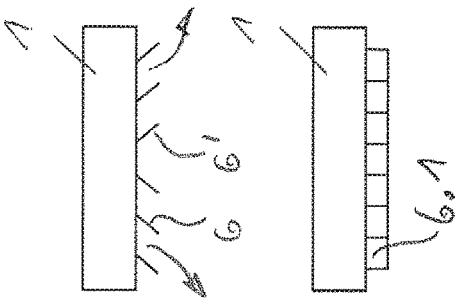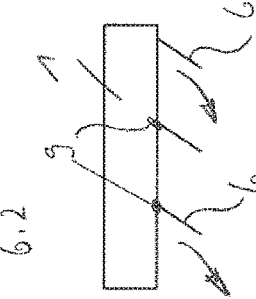

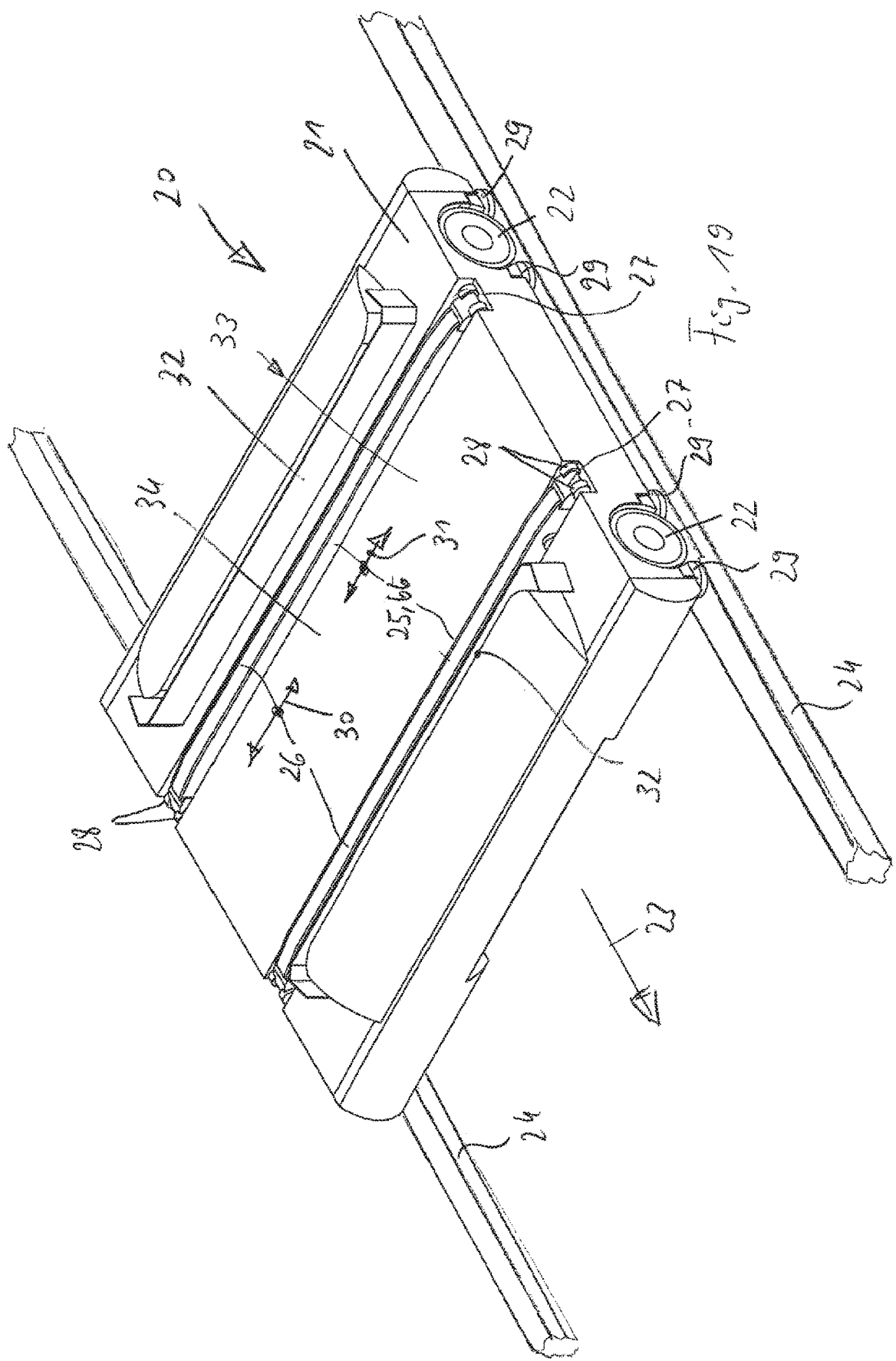

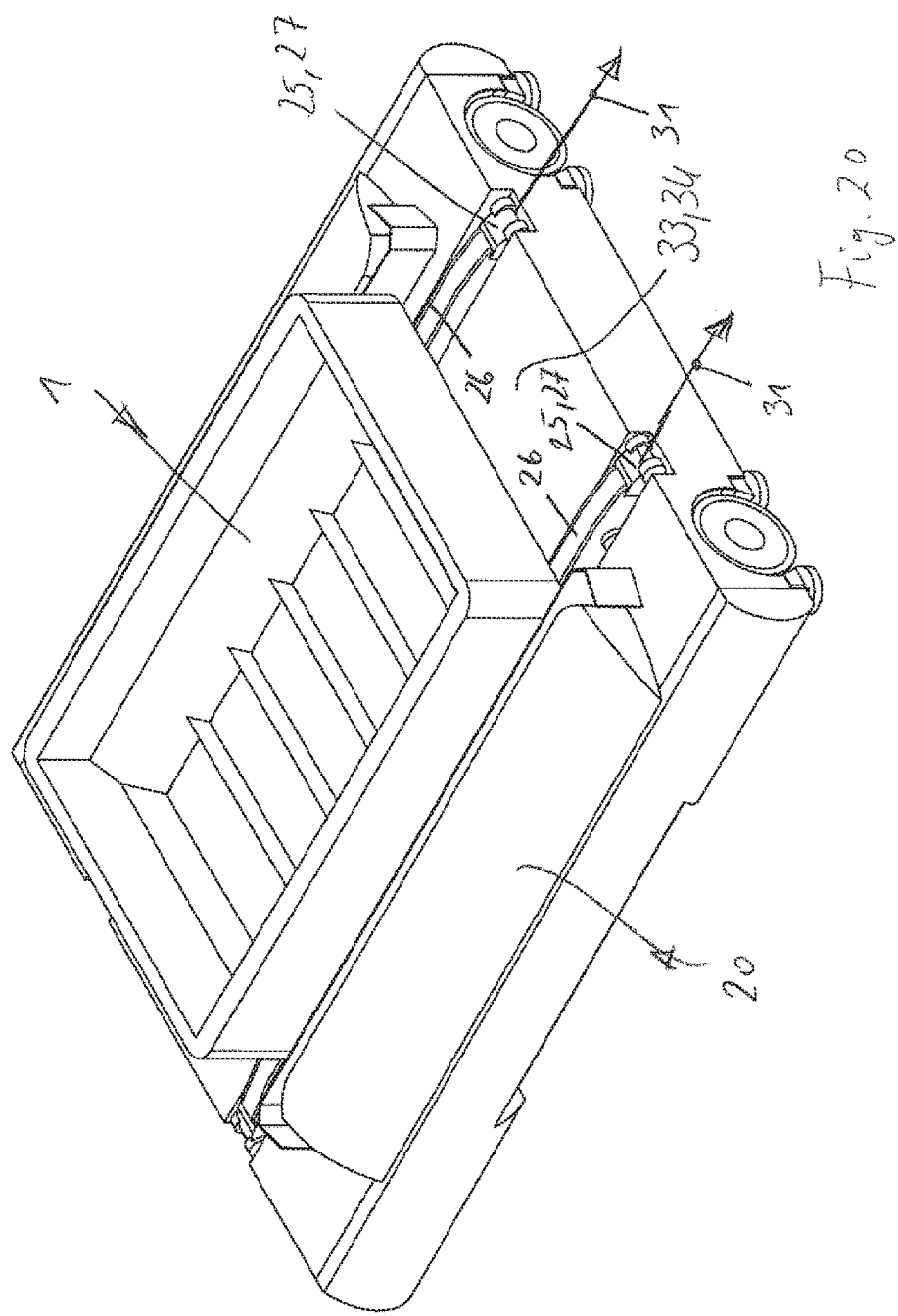

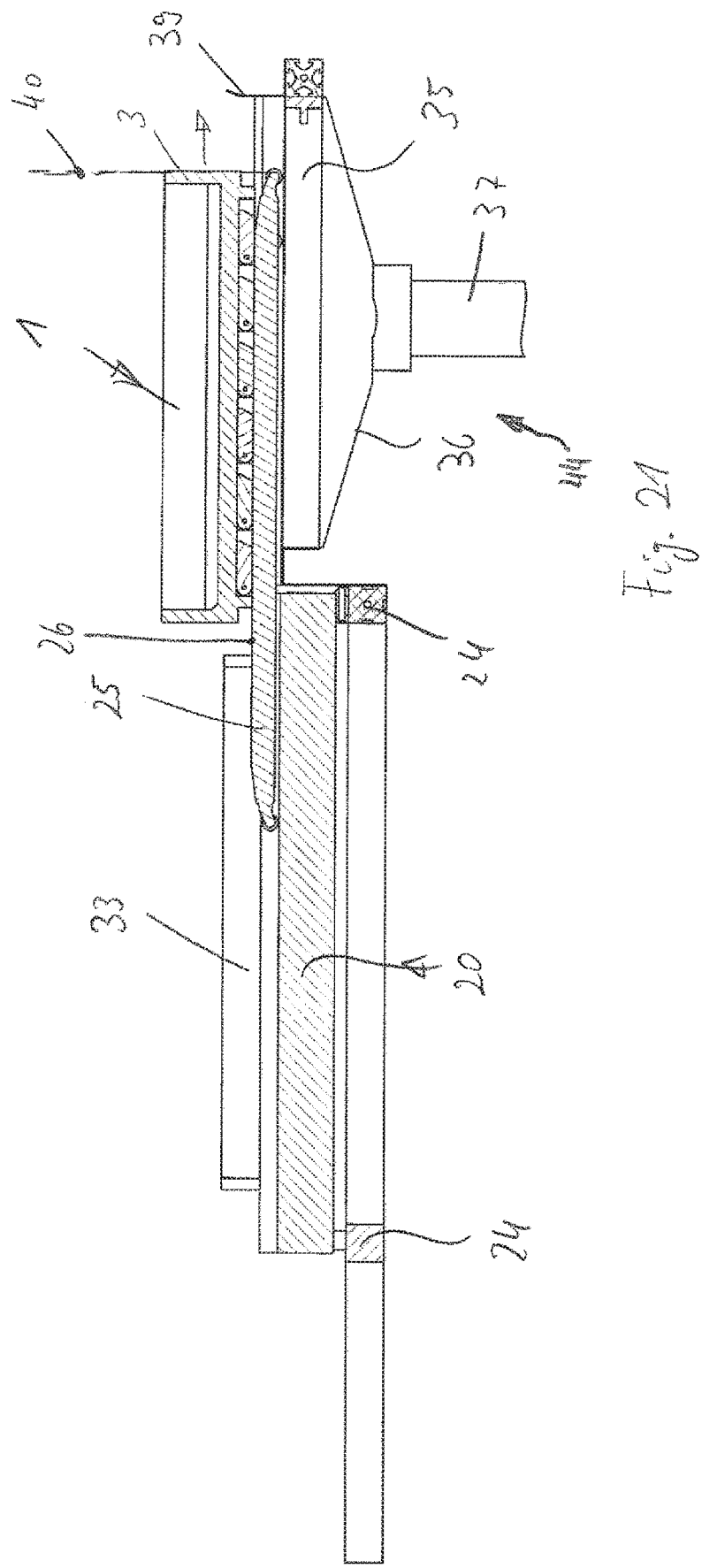

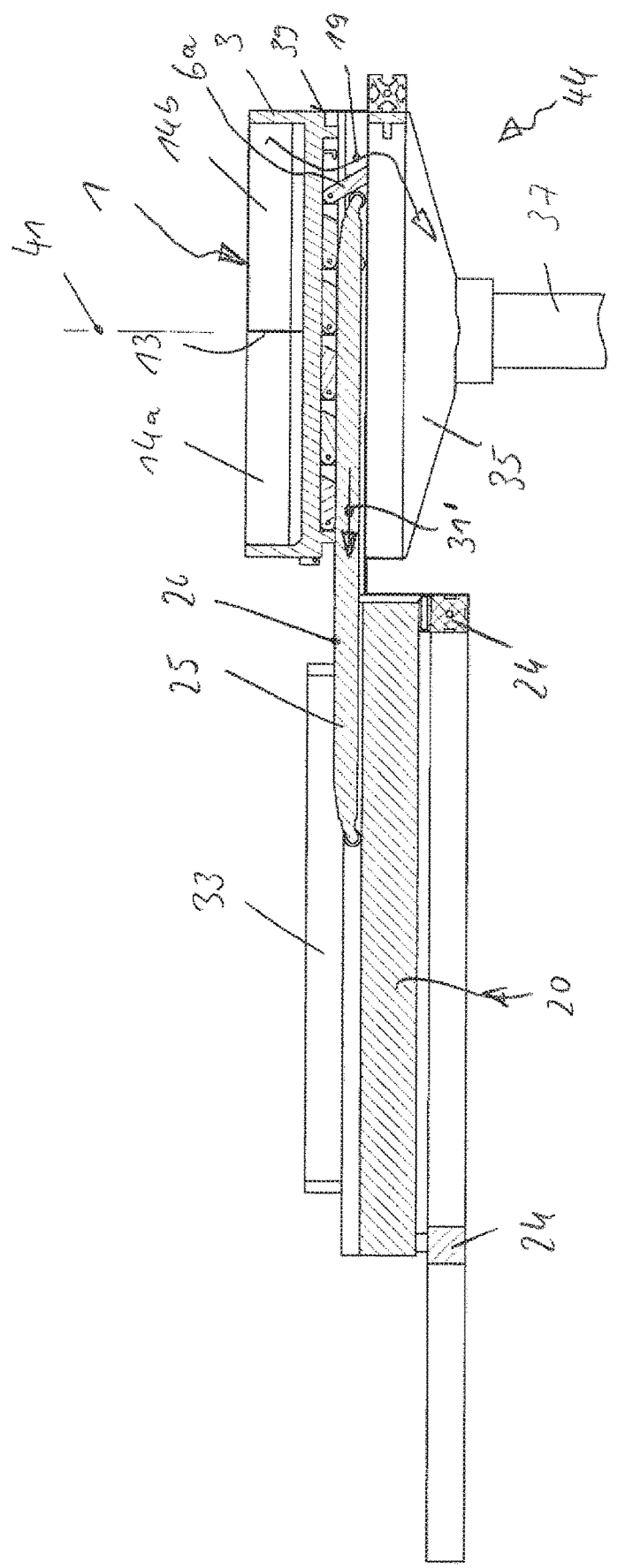

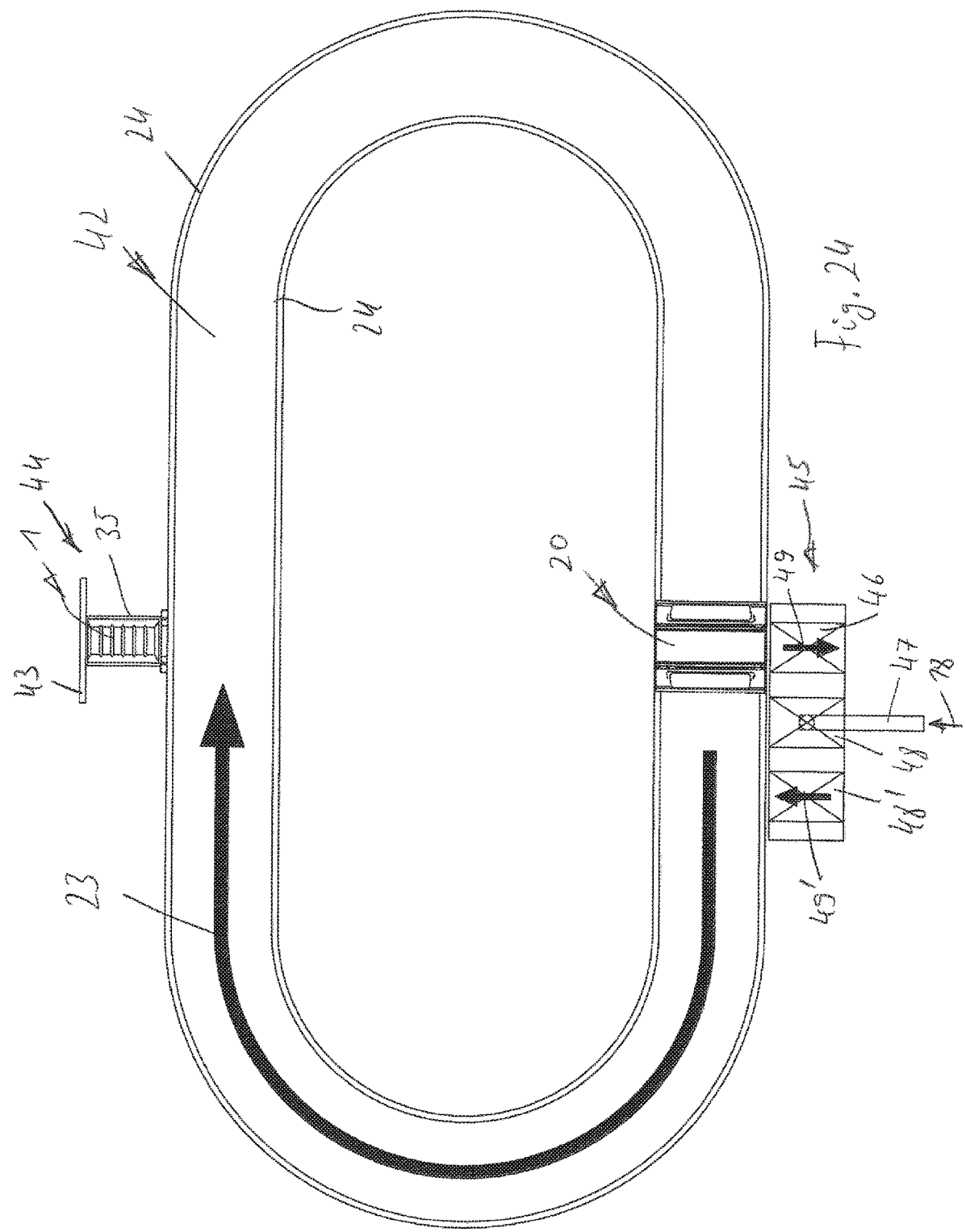

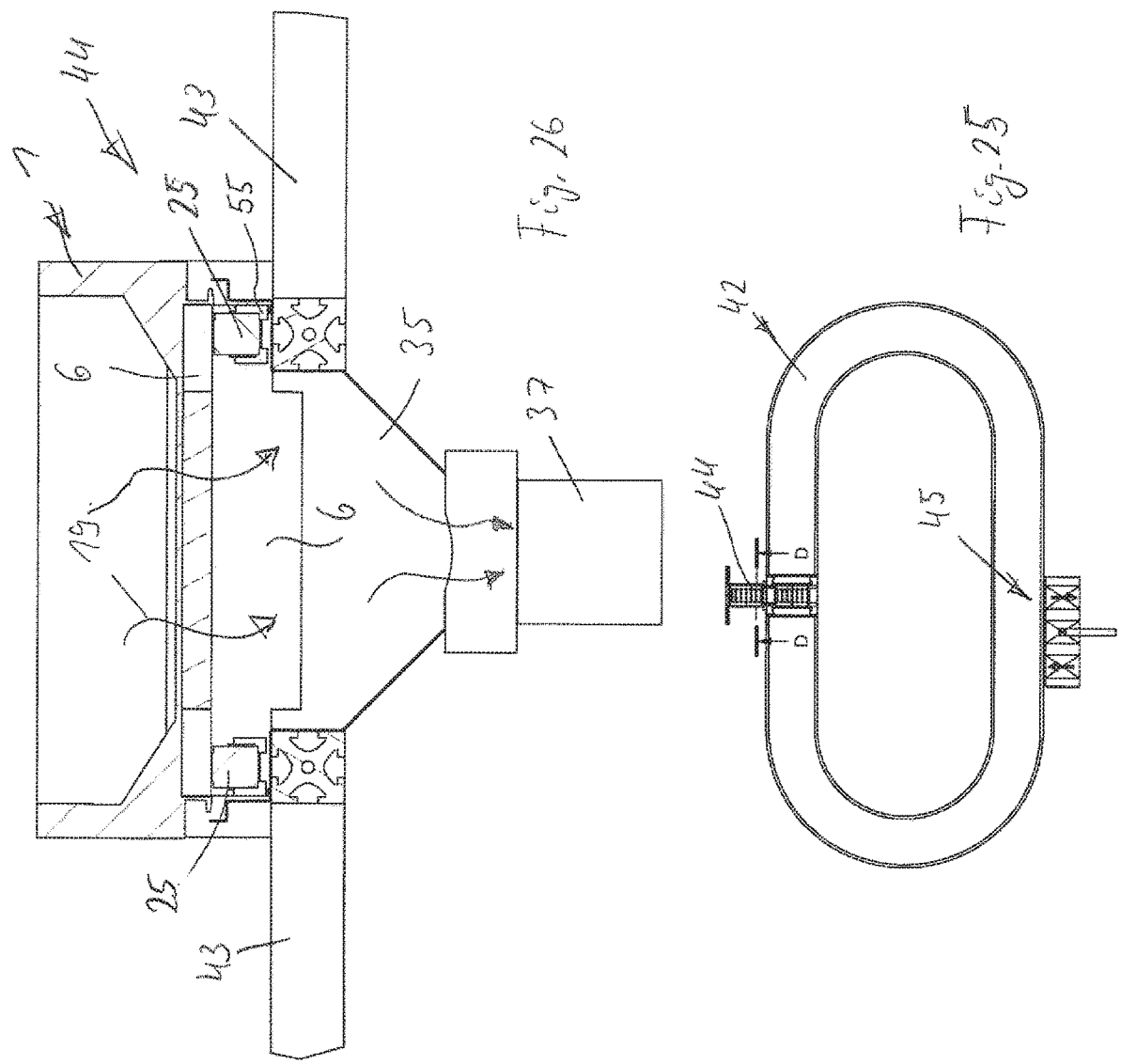

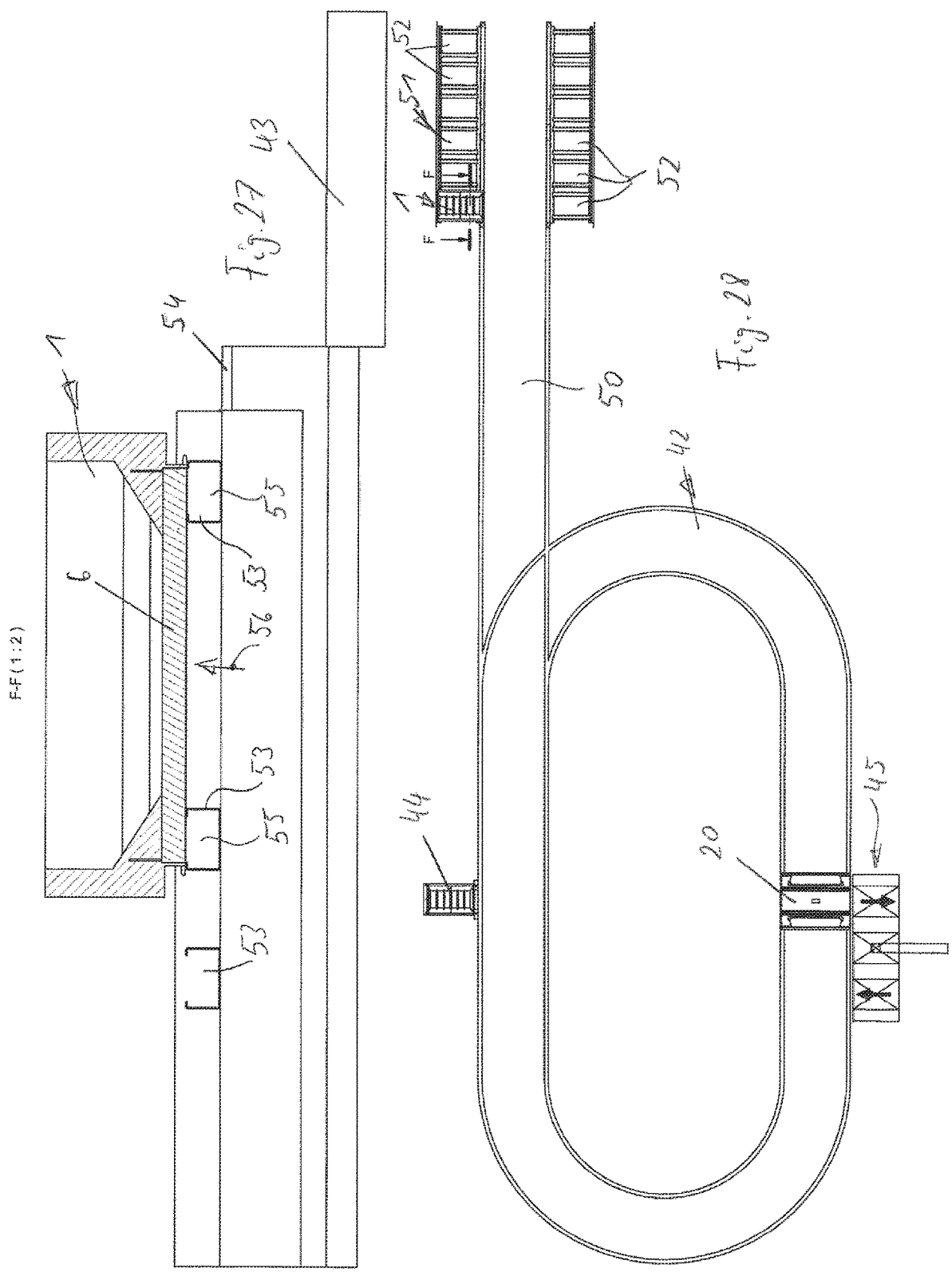

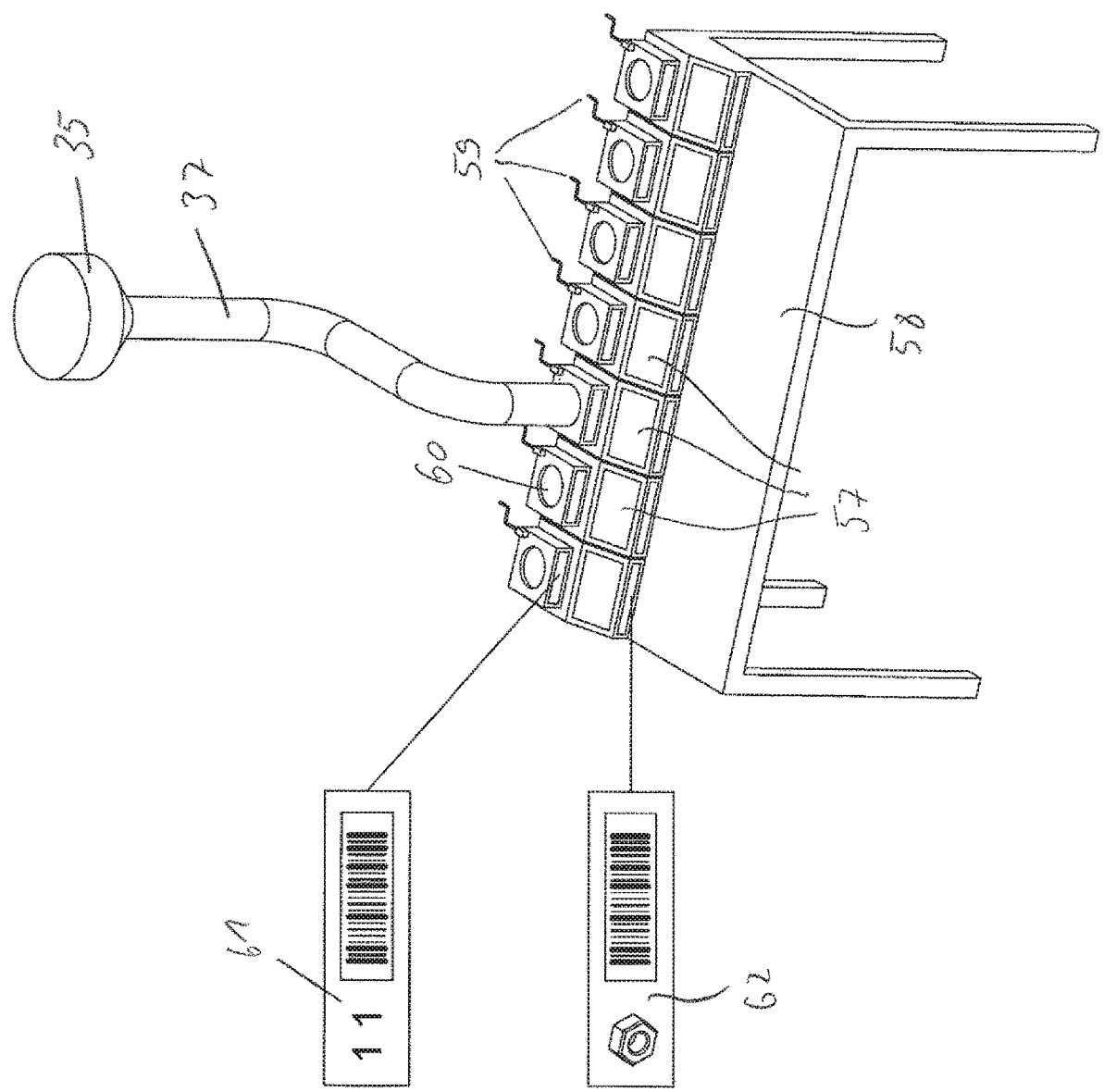

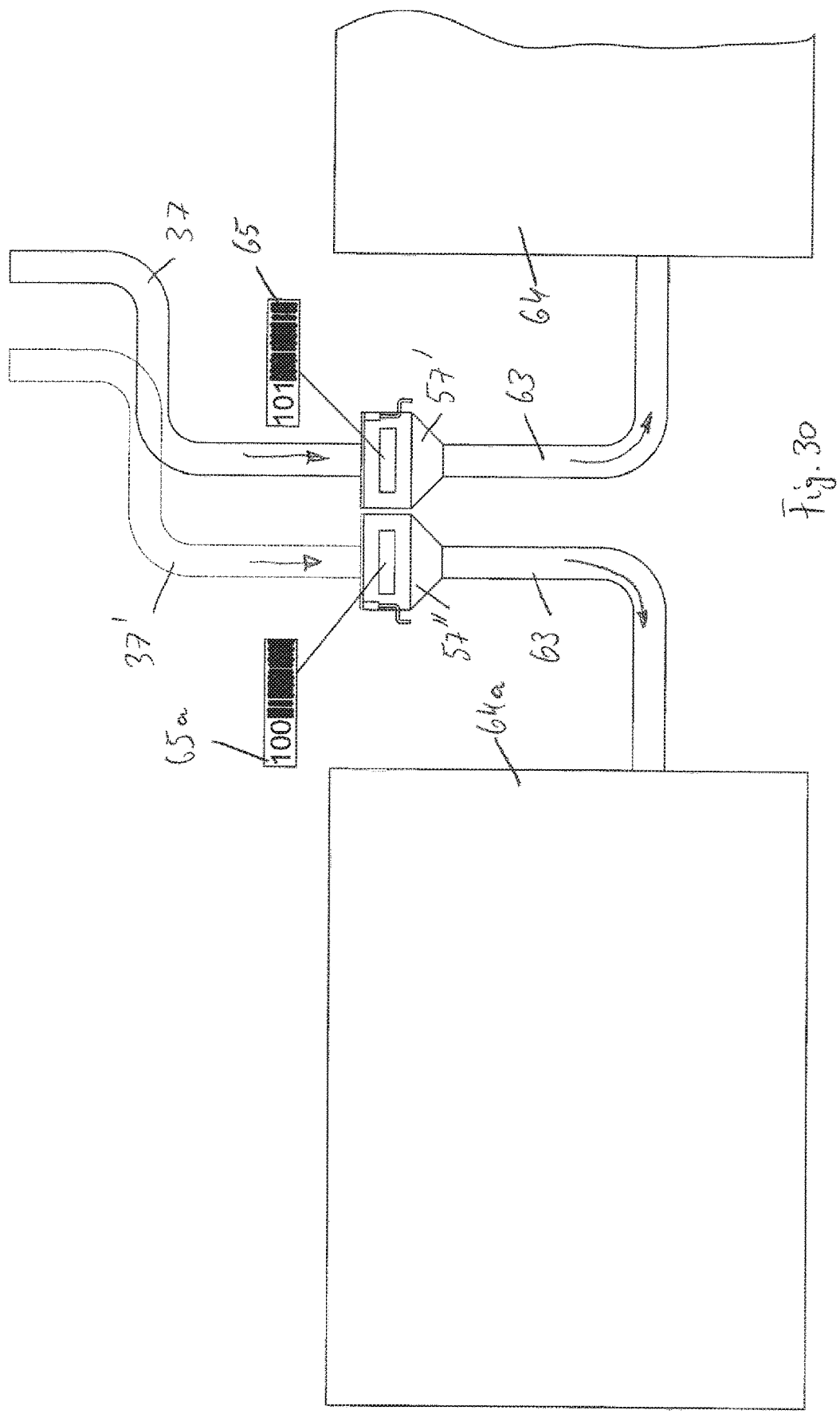

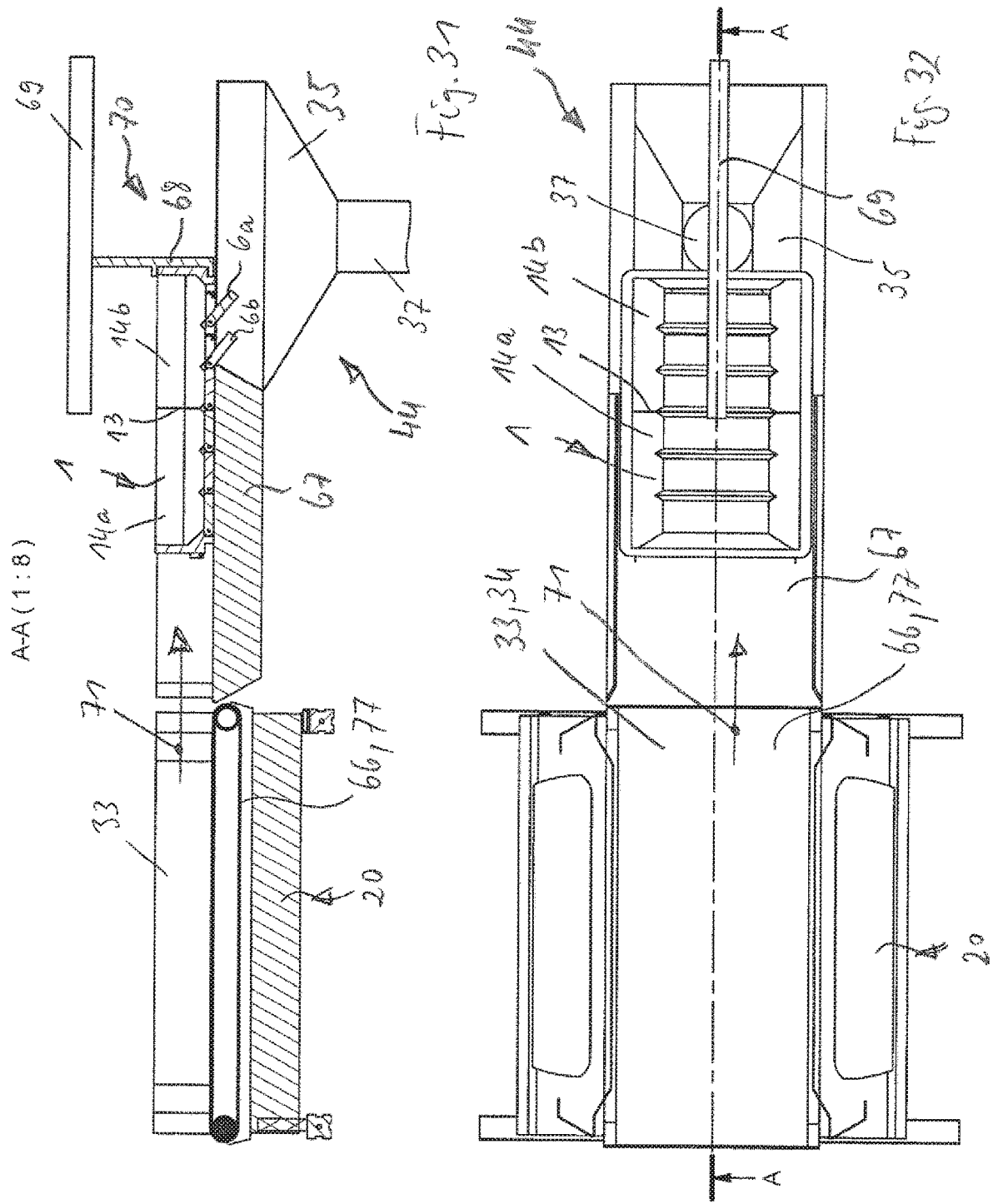

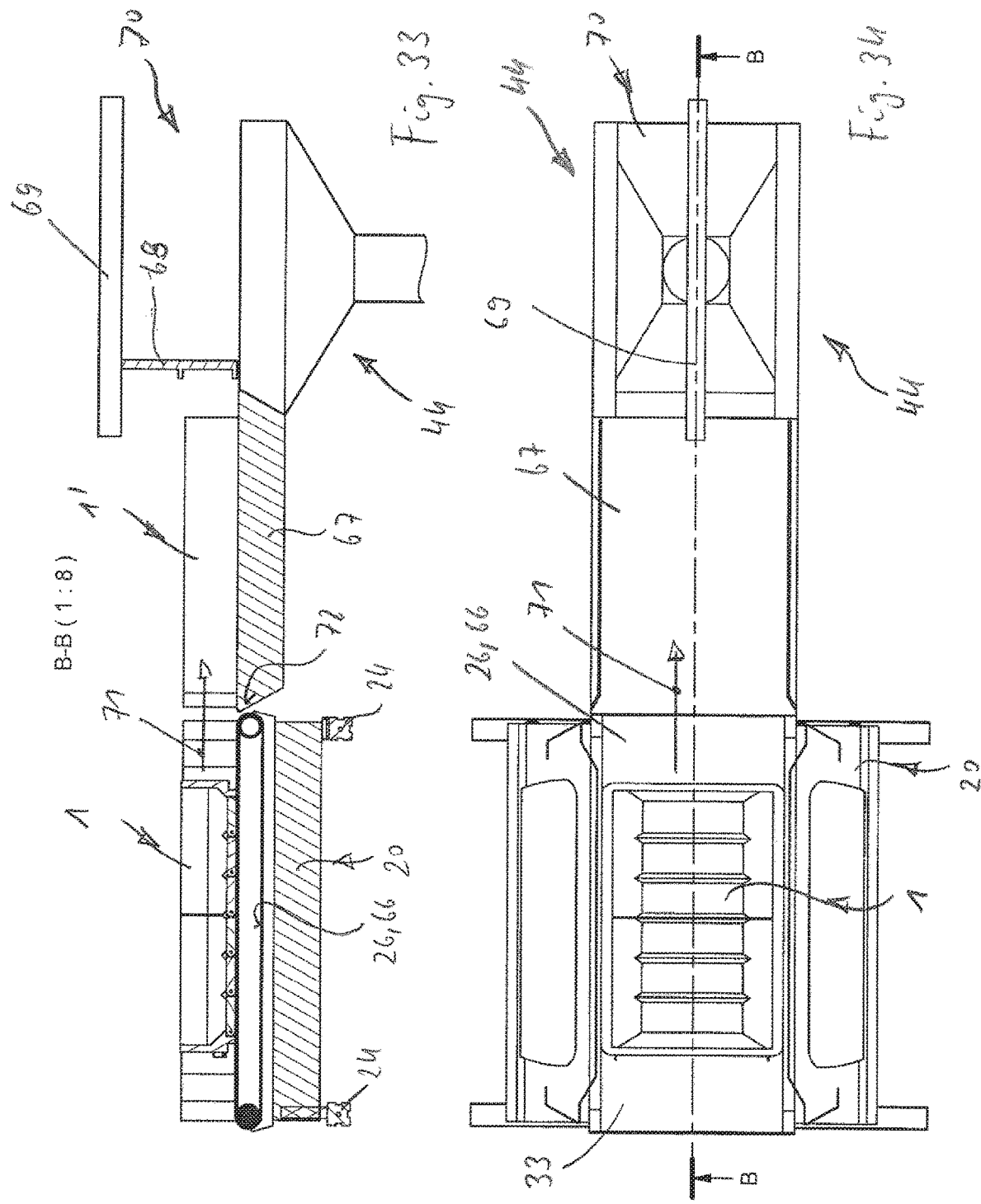

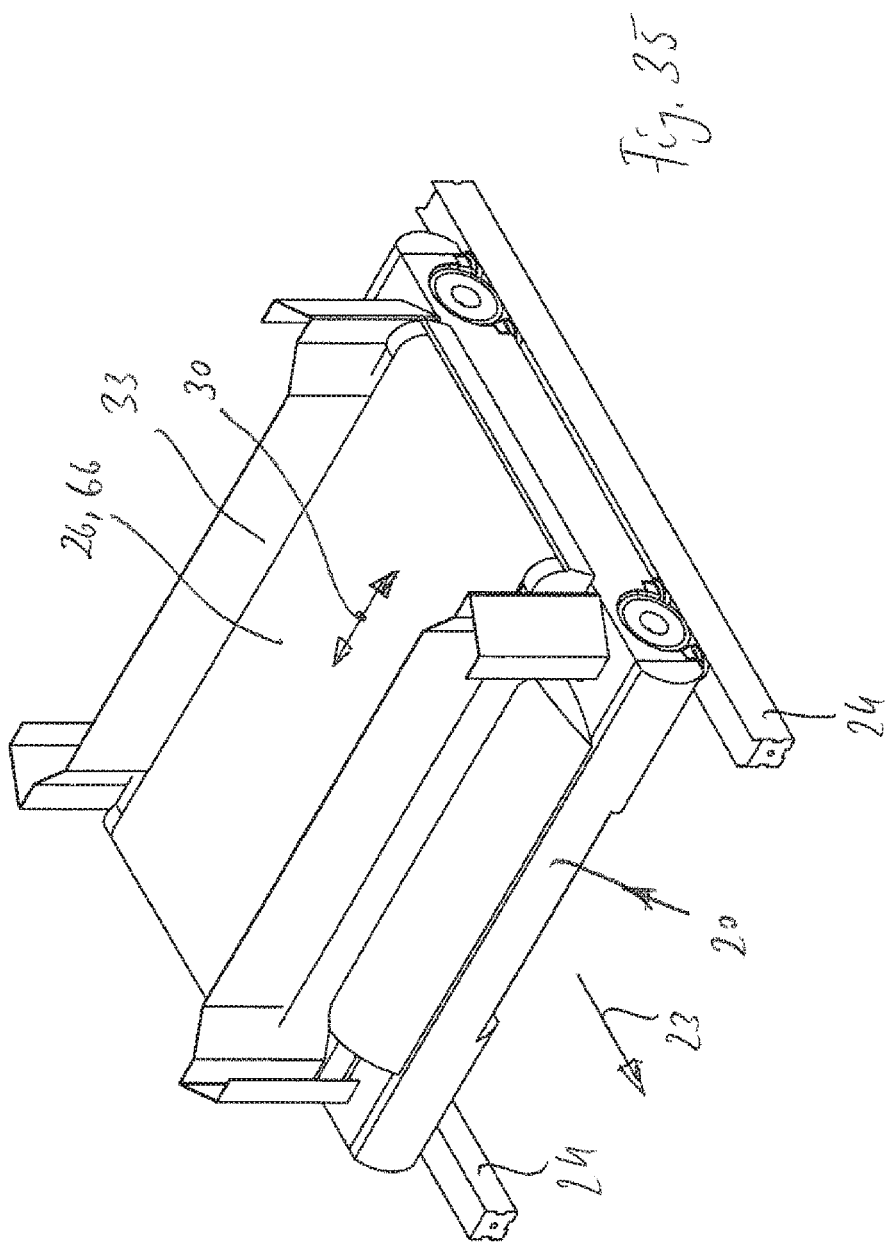

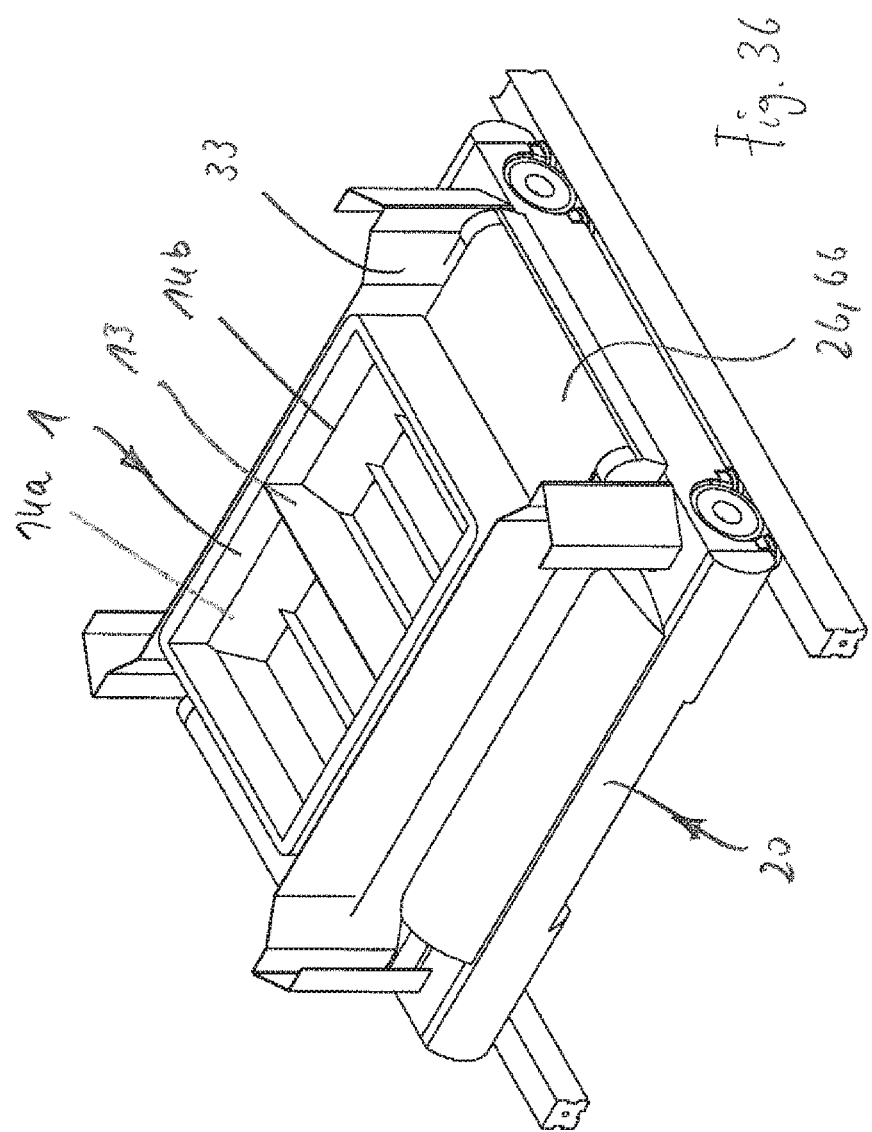

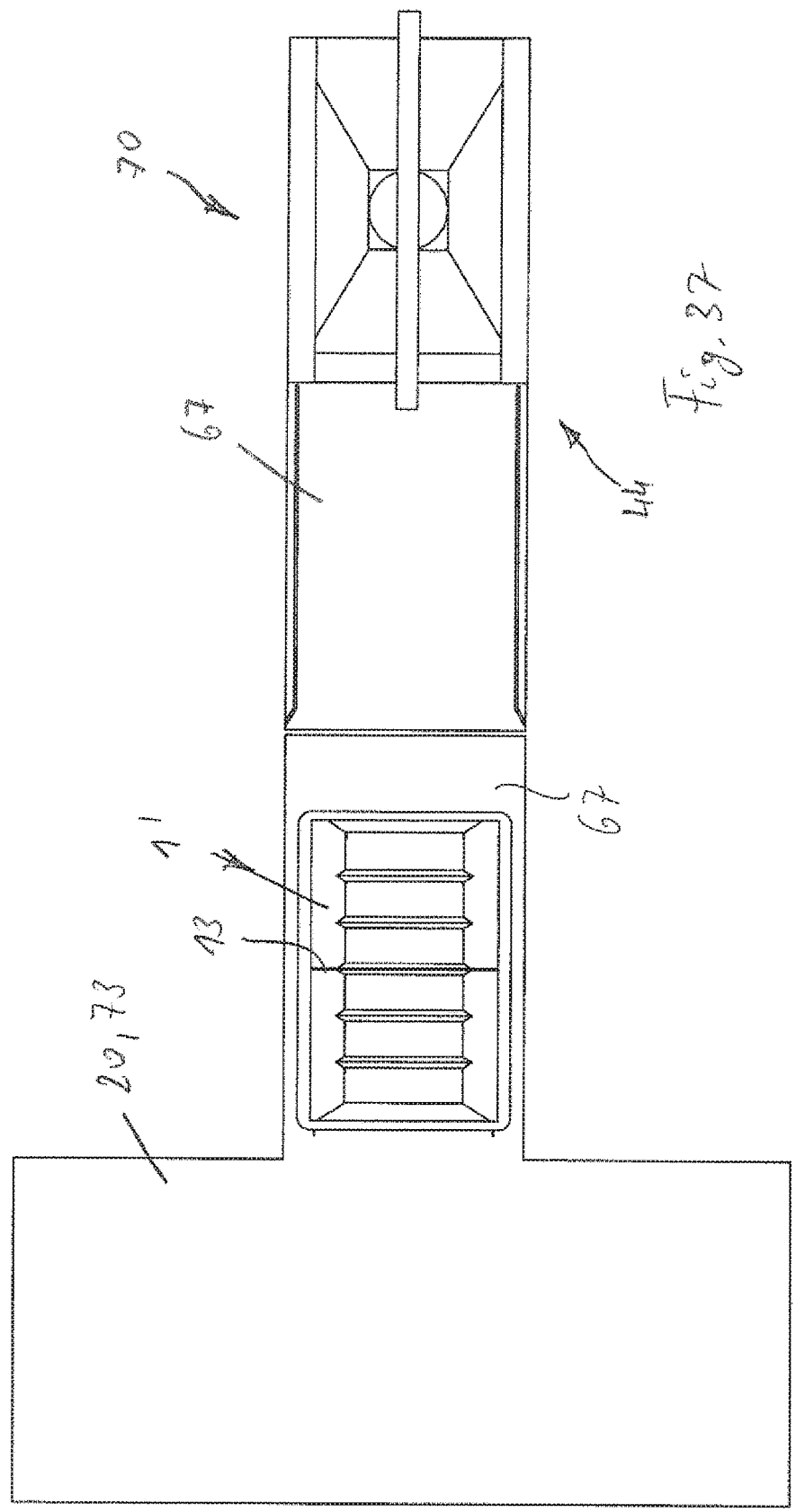

CONTAINER FOR THE INDIVIDUAL RELEASE OF BULK MATERIAL AND METHOD OF OPERATION WITH A TRANSPORT ROBOT OR A LONGITUDINAL CONVEYOR

The present invention refers to a container for the individual release of bulk material and to a method of operation of such a container with a transport robot or a longitudinal conveyor.

From a number of patent applications which may be traced back to the present application, such as EP 2 826 731 B1, it is known to autonomously move rail-bound transport robots in the region of a railway and thus perform various loading and unloading tasks for bulk materials.

Such tasks refer also to transport of usual boxed containers from a filling station to an unloading station. In order to transport bulk material it was known to fill such a simple boxed container with a defined predetermined quantity of bulk material in a filling station, move the same with a transport robot to a determined position in an unloading station and transfer there the bulk material container into a turning station, in order to topple the bulk material container in the turning station and then supply the bulk material into a hopper-like receptacle.

Such a method has enjoyed a wide success.

The free-flowing bulk materials which may be processed are considered, within the scope of the present invention, all bulk materials, such as screws, nuts, small parts of the same kind and type, granulates, powders, and similar. The invention also refers to a container for transporting free-flowing objects, which may be of any type and quantity.

In the transport of free-flowing articles inside a box-like container having an open top there is however a drawback in that only an exactly defined quantity of the same bulk material may be transported, since the container is only provided for being completely emptied and filled. Neither a partial filling of the container nor a partial release of a part of the bulk material from the container is possible.

The object of the invention is thus to develop a container for transporting bulk materials of above said kind, in that a controlled individual quantity or individual portions of unitary or different bulk materials may be released from the container as part of the entire filling quantity of the container, and also that the container may be filled with different filling quantities or portions and that these may be released, in a targeted way, at defined locations or in a single location, without having to perform a turning or tilting operation.

The invention also refers to a rail-bound transport robot, which is capable of automatically loading and unloading containers filled with a bulk material and of releasing the bulk material contained therein in an unmixed and targeted way.

The invention also refers to a method, which protects the operation of such a container independently from the presence of a transport robot. In this case, the container filled with the bulk material is positioned on a longitudinal conveyor, such as a roller track, and is transported by a longitudinal track positioned on the side of the roller track into a transverse conveyor, connected thereto, at the output end of which a filing and/or unloading station is provided.

The transfer to the filling and/or unloading station occurs with a gripping device which is movably actuated along an approach plane, which device engages the container, for example, on the front side, and which conveys the same in the region of the filling and/or unloading station.

The invention also refers to a method for the operation of such a container for free-flowing articles in the region of a rail track in connection with a transport robot. The invention refers in particular to a rail-bound transport robot as a transport means for such container transporting bulk material articles.

In order to obtain the objects, a container for transporting free-flowing bulk articles is characterized by the subject matter of independent claim 1.

A method for operating such a container on a transport robot is characterized by the subject matter of the valid, independent claim 7.

A characteristic of the invention is that the container for transporting bulk articles is a multi-compartment container. It has a number of separate compartments, wherein each compartment is associated to a respective separate bottom-side opening lid.

This means that the container has no continuous bottom wall, but a bottom wall which is formed by a number of opening lids, which may be operated individually and separately.

Thus, the advantage is achieved that the bottom wall is used for emptying the multi-compartment container, since in the bottom wall a plurality of opening lids is positioned, through which the bulk material loaded inside the multi-compartment container may be delivered in a targeted way downwards through the opened opening lids. A known turning station is thus omitted, where the containers to be emptied are usually turned for unloading. Due to the association with separate opening lids, the multi-compartment container may be emptied at any position on the rail track since a turning station is not required anymore.

In a first embodiment of such a multi-compartment container, the bottom wall of the multi-compartment container is formed by at least two gravitationally tiltable opening lids, and each of the opening lids is associated to a separation wall, so that in this one extreme exemplary embodiment the container is separated, at the center, by a separation wall, and on the left and right side of the separation wall the bottom wall is respectively formed by a single opening lid, in order to form two compartments in the multi-compartment container, which may be filled and emptied independently from each other.

In this embodiment there is however a drawback in that with respect to the dimensions of such a multi-compartment container, which for example has a length of 600 and a width of 400 mm, the length of the bottom lid is about 280 mm. thus a relatively large unloading space beneath the multi-compartment container is required, in order to obtain a complete opening of such a large opening lid.

For this reason, in a development of the invention the opening lids are subdivided, so that even for example in the case of a central separation wall inside the multi-compartment container, three identical opening lids are associated to each compartment, which open and close like blinds.

This has the advantage that due to the segmentation or subdivision of a single large opening lid, which is respectively associated to the compartment, three individual smaller opening lids may now be used, wherein also for these opening lids the basic principle holds true that each opening lid is formed by a lid which may be opened by lateral swiveling under the gravitational load. The smaller segmented opening lids thus require a smaller swiveling space downwards, whereby the unloading height over an unloading station may be reduced.

Through the multiple configuration of the multi-compartment container with a plurality of compartments, the bottom wall of each compartment is formed by a plurality of opening lids. Thus, the advantage is obtained that also further separation walls may be comprised, since in principle each opening lid may be associated to a separation wall, and thus a plurality of compartments is formed within the multi-compartment container, since at least one opening lid may be associated to each compartment.

Thus, a modular structure for the multi-compartment container is provided, in that inside the multi-compartment container one or more separation walls may be selectively placed for forming one or more compartments, wherein each compartment may be filled with a different quantity of a different bulk material.

For example, a multi-compartment container may have four compartments and each compartment may be filled with a different bulk material. Such a bulk material may for example be formed by screws or nuts of a certain size, so that, for example, the first compartment may be filed with M6 nuts, the second compartment with M8 nuts, the third compartments with M10 nuts and the fourth compartment with M12 nuts.

This is analogously valid for the filling with screw or other free-flowing articles, such as LEDs, electronic circuits or any other electric or electronic component.

Thus, the invention has the advantage that each compartment in the multi-compartment container may be filled precisely with a determined bulk material, and that the bulk material may be delivered in a targeted way only by the respective compartment, without influencing the bulk materials of the other compartments.

In a preferred embodiment it is thus foreseen that each bottom wall of the respective compartment of the multi-compartment container is made of a plurality of opening lids, and that the opening lids are locked by a central horizontally movable locking slider in their closed position.

If the locking slider is moved horizontally, then the lock between the locking slider and the respective opening edges of the opening lids is released, and the opening lids rotate in their respective opened position, due to gravity.

The invention is not limited to any kind of configuration of the opening lids.

In a first embodiment the swivel axes of the individual opening lids are parallel to the movement direction of the multi-compartment container, which is transported by a transport robot, which is driven in this direction.

In another embodiment of the invention the swivel axes of the opening lids may be perpendicular to the moving direction of the multi-compartment container and thus of the transport robot. In a third embodiment all opening lids may only open in a single opening direction. And in a fourth embodiment the opening lids may open in mutually opposed opening directions.

In a further embodiment it may also envisaged that the opening lids open from swivel bearings, which are positioned on the edges. And in a further embodiment the opening lids may open outwards from a central plane.

In a preferred embodiment of the invention a method for operating such a multi-compartment container in connection with an autonomous transport robot, which is drive in the region of a rail track is described.

In this embodiment, the invention claims that the multi-compartment container is housed within a loading space, open at the top, on the upper side of the transport robot, and the bottom side of the loading space is formed by two parallel and mutually spaced telescopic arms, positioned on the same plane, which are respectively covered by a movingly driven conveyor belt.

Such a telescopic arm having movingly driven conveyor belts placed on the same is the subject matter of other patents of the same applicant. Reference is herewith made to that disclosure with respect to the function of such a transport robot in connection with telescopic arms and respective conveyor belts.

This type of transport robot is thus characterized in that it has two parallel and movable telescopic arms, which are driven in the longitudinal direction, whose upper sides are respectively covered by a movingly driven conveyor belt.

Thus, it is possible for the inventive multi-compartment container to be received within the loading space of the transport robot while being placed with its bottom side on the telescopic arms. The telescopic arms provide a protection against the opening lids opening into the loading space of the transport robot.

In order to unload such a multi-compartment container, initially the telescopic arms with the loaded multi-compartment container have to be laterally extracted from the transport robot, i.e. are supported by a support profile perpendicularly to the travel direction of the transport robot and of the loaded multi-compartment container.

Thus, the telescopic arms with the loaded multi-compartment container reach the region of an unloading station, which in particular is characterized in that the bottom wall of the multi-compartment container slides into an unloading hopper while conducing the bulk material. In the final loading position, the multi-compartment container rests on the extracted telescopic arms, wherein it is ensured that the extracted telescopic arms lock the swiveled position of the opening lids, so that—as long as the telescopic arm engages the multi-compartment container from below—also the opening lids are held in their closed position.

However, as soon as the telescopic arms are retracted into the transport robot, the opening lids of the multi-compartment container are released and the bulk material filled into the internal space of the multi-compartment container in the different compartments may be unloaded, being exactly positioned, by controlled release (unlocking) of the opening lids of the respective compartment into the unloading hopper.

If the telescopic arm is only partially retracted, then also only the two or three opening lids, which are not engaged from below by the telescopic arm are opened, so that they automatically and gravitationally swing outwards into their opening position. Thus, only one compartment may be emptied.

By further retraction of the telescopic arm into the transport robot, also the other opening lids are successively opened by gravitational force, and the respective compartment is automatically opened and the bulk material is loaded into the unloading hopper.

Thus, a respective compartment may be opened, while maintaining the purity of the respective content, independently from each other, starting from the right wall of the multi-compartment container up to the left wall of the multi-compartment container, whereby the respective compartment is opened.

It is obviously also possible to operate the multi-compartment container without compartments, i.e. when the telescopic arm is completely retracted into the transport robot, all opening lids in the bottom wall of the multi-compartment container are automatically opened by gravity and the entire inner space of the multi-compartment container, which is loaded with bulk material, falls by gravity into the unloading hopper.

The invention also refers to the fact that in the region of a multiple branched and possibly also multiplane rail track a plurality of unloading and filling stations are arranged.

Multiple expulsion tracks may also be used, where the empty containers are stored in a rack system on one or more levels at different heights and if necessary loaded and transported to a filling station by a transport robot.

In a preferred embodiment of the invention, the unloading hopper is connected to a fall tube, which may be manually inserted on different collector containers depending on the type of bulk material.

Instead of a manual reinsertion of the fall tube on different collector containers, an automatic displacement of such a fall tube may also be performed on different containers. This may be accomplished with an X-Y sledge system.

It is advantageous if an unmixed release of the filling product is performed through the unloading hopper and the fall tube in different collection containers containing the respective kind of product.

Obviously, a mixing of filling material in such collection containers may also be accomplished by an unloading station, when for example M7 nuts and M7 screws are grouped into a single container.

The distribution of the articles of bulk material into the individual collection containers may be controlled by sensors, wherein a sensor is associated to each container, wherein the sensor detects the respective position of the fall tube thus determining which container is presently filled with which filling material.

It is also possible to transfer the fall tube automatically or manually to different collection containers, which, in turn, are connected through bulk material conducting associated fall tubes with different types of processing machines, in order to ensure an automatic transfer of bulk materials to different processing machines.

The object of the invention is obtained not only by the subject matter of the individual claims but also by the combination of the individual claims to each other.

All information and characteristics disclosed in the documents, including the abstract, in particular the spatial configuration illustrated in the drawings, are claimed as relevant to the invention, as long as they are new, alone or in combination, with respect to the state of the art.

The invention is explained in the following by means of drawing representing only one way of putting it to practice. Further inventive characteristics and advantages are also obtained from the drawings and the respective description.

In particular:

FIG. 1 shows a plan view of a multi-compartment container without the arrangement of separation walls;

FIG. 2 shows the section along line A-A in FIG. 1;

FIG. 3 shows a perspective view of the multi-compartment container of FIGS. 1 and 2;

FIG. 4 shows a further section along line A-A of FIG. 1 with an outwardly offset section line for illustrating the locking slider used;

Figure 23:
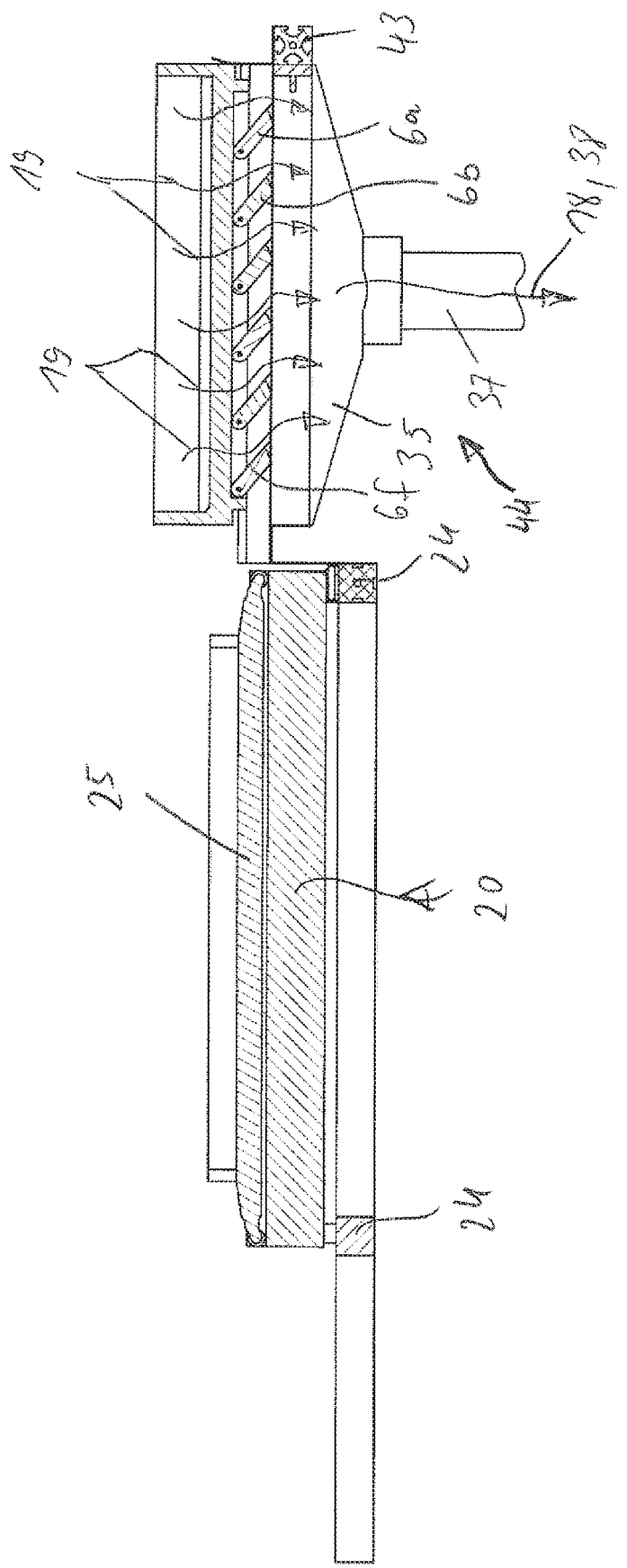
Figure 38:
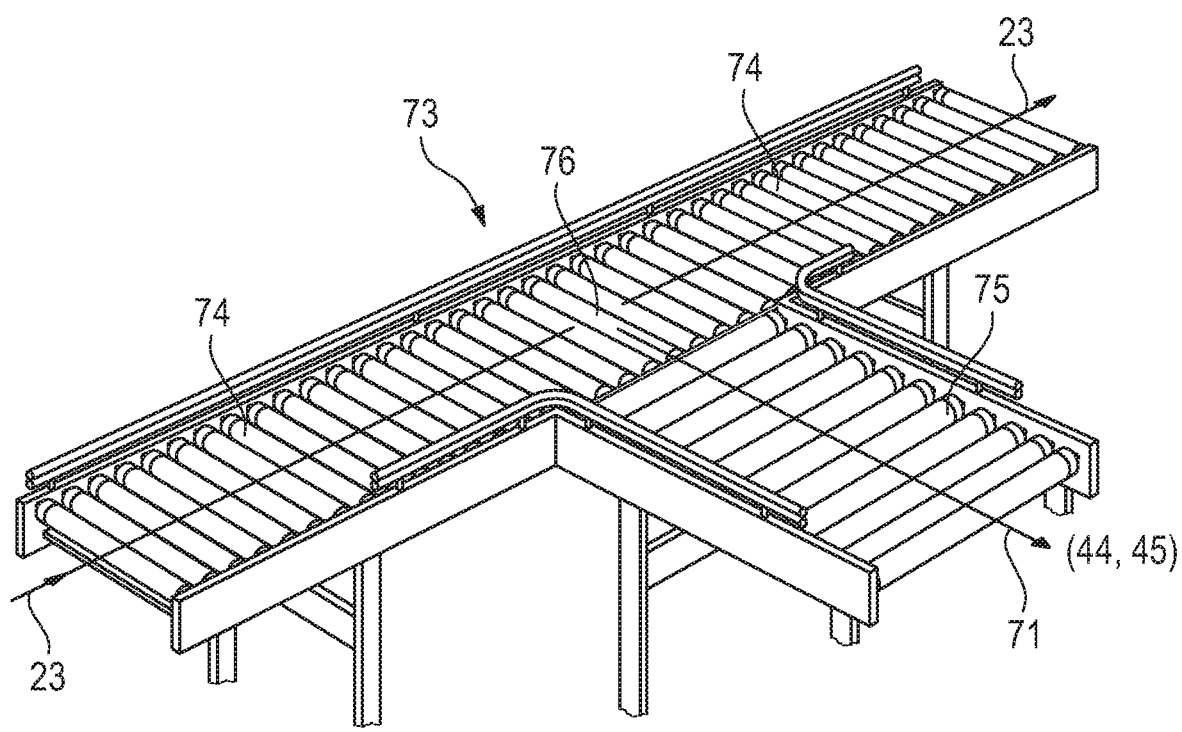

FIG. 5 shows the perspective view of a multi-compartment container having a separation wall and the separation into two compartments, FIG. 6 shows the plan view of the arrangement of FIG. 5, FIG. 7 shows a schematic representation when opening a single opening lid in a compartment, FIG. 8 shows a section along line B-B in FIG. 6, FIGS. 9 to 10 show a first embodiment in a side view and front view of the arrangement of opening lids, FIGS. 11-12 show a second embodiment of the arrangement of opening lids, FIGS. 13-14 show a third embodiment of the arrangement of opening lids, FIGS. 15-16 show a fourth embodiment of the arrangement of opening lids, FIGS. 17-18 show a fifth embodiment of the arrangement of opening lids, FIG. 19 shows a perspective view of a transport robot of the invention, FIG. 20 shows the transport robot of FIG. 19 with a loaded multi-compartment container, FIG. 21 shows the transport robot of FIG. 20 in a section at the height of a telescopic arm in a partial transfer position, FIG. 22 shows the same view of FIG. 21 when reaching the complete transfer position and at initial unloading of the compartments, FIG. 23 shows an exemplary embodiment, in which, with respect to FIG. 23, all compartments are unloaded or only a single compartment is present, FIG. 24 shows a plan view of a rail track for a transport robot with an unloading station and a filling station, FIG. 25 shows the same view of FIG. 24, but in a downsized embodiment in a representation of the section guide, FIG. 26 shows a section of the unloading station in the direction of the arrow D-D in FIG. 25, FIG. 27 shows a section in the direction of arrow F-F in FIG. 28 through a storage place for the storage of a multi-compartment container with locking of its bottom opening lids, FIG. 28 shows the plan view of the rail track having an expulsion track and a rack system for storing the multi-compartment containers, FIG. 29 shows a perspective view of an operating position or mounting position for the unmixed distribution of bulk materials, FIG. 30 shows an exemplary embodiment, modified with respect to FIG. 29, in which it is shown how different bulk materials may be conveyed, unmixed, to different processing machines, FIG. 31 shows a section of a further embodiment, in which the transport robot is provided with a simple longitudinal conveyor, and the transfer to a filling station takes place by means of a movably driven gripping device, FIG. 32 shows the plan view of FIG. 31, FIG. 33 shows the basic position of the arrangement of FIG. 31 having a multi-compartment container still loaded on the transport robot, FIG. 34 shows the plan view of FIG. 33, FIG. 35 shows a perspective view of a transport robot having a simple longitudinal conveyor, such as the one used in the exemplary embodiment of FIGS. 31-34, FIG. 36 shows the same view of FIG. 35, with a multi-compartment container received inside the transport robot, FIG. 37 shows a transport position of the multi-compartment container corresponding to FIG. 32, from an approach plane 67 to a filling and unloading station, FIG. 38 shows a perspective view of a longitudinal conveyor having a transversal conveyor connected thereto, on which the multi-compartment containers to be emptied and filled are transported.

In FIGS. 1 to 3, a multi-compartment container 1 is shown, which consists essentially of two mutually parallel longitudinal walls 2 and perpendicularly arranged transverse walls 3, wherein the bottom wall 5 is formed by a plurality of mutually parallel opening lids 6a-6f. The multi-compartment container is preferably of rectangular or square shape. However, the invention is not limited to such an embodiment. It may have any ground plan shape, i.e. oval, triangular, polygonal or round. It is also not necessary that the side walls are vertical and upright. They may also have a conically tapering or widening shape towards the bottom side.

In the embodiment shown, the longitudinal and transverse walls 2, 3 run obliquely inwards in the direction of the bottom wall 5, in order to ensure a perfect inflow of bulk material and a deposition on the bottom wall 5.

The opening lids 6 are each pivotally mounted on one side in a pivot bearing 9. The pivoted position is locked by a locking slider 10.

When operating with a transport robot 20, a locking slider 10 is not strictly necessary because the locking of the individual opening lids 6 is performed by a telescopic arm 25, as will be explained later.

In the illustrated embodiment, the locking slider 10 is used for manual locking of the individual opening lids 6, because each opening lid has a lid edge 16 at its free pivotable end which rests on an associated locking protrusion 12 formed of a longitudinal locking slider 10.

The locking slider 10 may thus be moved manually or by a motor in the direction of arrows 11.

The inner space 8 of the multi-compartment container 1 is filled with a bulk material 18, wherein for the sake of clarity in the illustrated embodiment according to FIGS. 1 to 3, only a single compartment 14 is present, which is formed entirely by the inner space 8.

In this single compartment 14 and thus in the inner space 8 a bulk material 18 is arranged.

For better protection of the individual pivot bearings 9 of the opening lids 6, the pivot bearings 9 are covered from above by horizontally laid cover profiles 4, which are covered by the loaded bulk material 18.

In the illustrated embodiment, the multi-compartment container 1 is movably driven in the direction of arrow 23, as will be explained later with reference to a transport robot 20 to be described.

FIG. 4 shows a section through a locking slider 10, and it may be seen that a number of locking protrusions 12 is arranged at the free lower end of the locking slider, which engages under the free pivotable end of a lid edge 16 of the respective opening lid 6a-6f.

If the locking slider 10 is displaced to the left in the direction of arrow 11, the locking protrusions 12 are disengaged from the lid edges 16 of the opening lids 6a-6f, which then open abruptly due to gravity and pivot about the pivot bearing 9 in a counterclockwise direction.

In the embodiment of FIGS. 4 and 5—compared to the embodiment of FIGS. 1 to 3—it is shown that a central separation compartment 13 may form two separate compartments 14a, 14b, which are filled with different unmixed bulk materials 18a, 18b.

The invention is not limited to this: any number of separating compartments 13, which are parallel to one another and spaced apart from one another, may be provided in order to use the interspace between each separating compartment 13 as a compartment 14. A single separation compartment thus forms 2 compartments 14a, 14b and two separating compartments 13 would then form 3 compartments. The multiplication of the separation compartments 13 and the resulting number of compartments 14 may be arbitrarily continued.

The exemplary embodiment according to FIG. 5 shows that the separation compartment 13 has such a length that it is connected in a bulk-material-tight manner with both front faces to the mutually parallel longitudinal walls 2.

However, the invention is not limited thereto. In another embodiment a further central longitudinal wall is provided, which is arranged in the central axis of the container 1 and which separates the 2 compartments 14a, 14b formed by the single separation compartment 13 into a total of 4 different compartments 2×14a and 2×14b. The compartments 14a, 14b may thus be divided in a matrix-like manner by means of a transverse separation compartment.

In all exemplary embodiments, at least one bottom opening lid 6a-6f should also be associated to the respective compartment in order to provide a targeted emptying of the respective compartment.

In the case of the matrix-like subdivision of the compartments by at least one additional transverse separation compartment, whose longitudinal extension intersects the longitudinal extension of the one or more separation compartments 15 at an angle of 90 degrees, it may then be foreseen that the bottom-side opening lids 6a-6f are longitudinally bisected, which means that they no longer extend from one longitudinal wall 2 to the opposite longitudinal wall 2, but only up to half of the container, namely up to its central longitudinal line.

The one additional transverse separation compartment is then positioned on the middle longitudinal line of the container 1 and the bottom opening lids 6a-6f extend longitudinally only to the central longitudinal line of the container 1, so that a separately controllable opening lid is associated to each matrix-like compartment 2×14a and 2×14b, respectively.

It is also not necessary for the solution that the separation compartments 13 and the optional additional transversal separation compartments are formed in a straight line. They may have a bent, wavy, half-round or round shape in plan view. The respective opening lid 6a-6f which forms the bottom side of the compartments 14a, 14b formed by the separation compartments should then be adapted to the cross-section of the compartment 14, 14b in order to achieve a complete, bottom-side emptying of the bulk material 18 stored in the compartments 14a, 14b.

The locking slider 10 is initially only adapted for manual operation, to manually lift the filled multi-compartment container from a transport robot 20 and to ensure that the opening lids 6a-6f open unintentionally. It is therefore a manually or motor-operated locking slider 10, which is used only in the case of manual removal of the multi-compartment container 1 from the transport robot 20.

In FIGS. 6 to 8 further details of the embodiments of FIGS. 4 and 5 are shown in greater detail.

Since the bottom wall 5 of the multi-compartment container 1 consists of a plurality of opening lids 6a-6f and each opening lid 6a-6f is formed in the same way, it is sufficient to describe the function of a single opening lid 6a.

Therefore, in the embodiment shown, the opening lid 6a, which is adjacent to the right transverse wall 3, is shown open only by way of example, to show that it pivots in the direction of arrow 15 about the pivot bearing 9, and thus the lid edge 16 gets out of engagement with the locking protrusion 12 of the locking slider 10.

FIG. 8 shows the open position of the opening lid 6a in the position 6a', where the bottom opening 17 is opened because the opening lid 6a forming the bottom wall 5 has now been pivoted to position 6a'.

Accordingly, a bulk material loaded into the compartment 14b will fall downwards at the opening of all opening lids 6 associated to this compartment in the falling direction 19.

FIGS. 9 to 18 show different embodiments of such opening lids, with two juxtaposed figures showing the side view and the front view of the respective embodiment. All embodiments are claimed as essential to the invention both alone and in any combination with one another.

FIGS. 9 and 10 show that all the opening lids 6 open in the same direction like blinds and are arranged parallel to one another, and in this case—according to the exemplary embodiment according to FIG. 3 —, the pivot bearing 9 are arranged in parallel to the travel direction in the direction of arrow 23.

FIGS. 11 and 12 show that the opening lids 6, 6' may also open, starting from a center line, in opposite directions, and FIGS. 13 and 14 show that the opening lids 6.1 and 6.2 may be arranged with their pivot bearings next to the respective longitudinal walls 2.

FIGS. 15 and 16 show that the pivot bearings 9 may also be arranged approximately in the center region of the bottom wall 5 of the multi-compartment container 1 and pivot against one another.

FIGS. 17 and 18 show that, compared to FIGS. 9 and 10, a plurality of opening lids 6 or also a smaller number of opening lids 6—compared to FIG. 9—may be used.

The segmentation of the bottom wall 5 in opening lids 6 of the same size may thus be realized in various ways, depending on the type, number and opening direction of the opening lids 6 a-f as shown in the embodiments of FIGS. 9 to 18.

FIG. 19 shows an embodiment of a transport robot 20, which consists essentially of a self-contained housing 21 in which the control computer, the drive, the batteries and the radio interface for communication with other transport robots and a control center, as well as all other elements useful for a self-sufficient operation of the transport robot 20 on the rails 24 of a rail track 42 are positioned.

In the exemplary embodiment shown, the transport robot 20 moves in the direction of arrow 23 on the rail 24. To this end the separately driven drive wheels 22 engage, by friction, the rail, wherein the wheels are surrounded by perpendicularly positioned guide rollers 29, which are supported by side profiles of the rail 24, in order to ensure a tilt-free operation of the transport robot 20 on the rails 24.

On the top of the housing 21 an upwardly open loading space 33 for receiving at least one multi-compartment container 1 is positioned.

It may of course also be the case, that a plurality of multi-compartment containers are received in the loading space 33, and that, for example, a loading and unloading from the left or right side of the transport robot 20 takes place. Accordingly, the telescopic arms 25, which form the bottom side of the loading space 33, are movably driven in the direction of arrows 31 to the left or right out of the transport robot 20. They are controlled by the central control of the transport robot.

Each telescopic arm 25 is covered by a conveyor belt 26, which is designed as a self-contained belt and is provided, for example, as a toothed belt. This toothed belt is movably driven as a circulating belt.

The front side of the respective telescopic arm 25 is designed as a conically vertically tapered telescopic head 27. In this area, support rollers 28 are arranged to ensure that the telescopic arm 25 easily engages below the bottom side of a multi-compartment container 1. The telescopic head thus forms an approach ramp for driving under the bottom side of a multi-compartment container, which is slightly raised from a support profile 43 used as a supporting surface.

The loading compartment 33 is laterally delimited by elevated side guides 32 and is (frontally) open on the side, in order to ensure that a multi-compartment container 1 accommodated in the loading space 33 may be pushed out in the direction of the arrow 30 to the left or right by means of the telescopic arms.

The arrowed direction 30 is directed in the drive direction of the conveyor belts 26, which are self-contained toothed belts which are movably driven on the telescopic arm 25.

Instead of the arrangement of a telescopic arm 25 having circulating motorized conveyor belts 26 arranged thereon, other expulsion systems may also be used, such as a simple expulsion arm, which is telescopically configured as a spindle drive, and which is capable to bring the multi-compartment container 1 from the loading space 33 into at least one unloading position, perpendicular to the travel direction (arrow 23). To this end, it may be provided as a gripping or pushing arm. Any loading and unloading means may thus be used, wherein however a telescopic arm 25 with circulating motorized conveyor belts 26 is advantageous, as explained in the following.

The invention is thus not limited to a transport robot with telescopic arms 25 and transport belts 26 movably driven thereon, while any loading and unloading device for a transport robot 20 may be used.

In FIG. 20, a first position of a multi-compartment container 1 is shown, which is shown in its loading position in the loading space 33 of the transport robot 20.

Its bottom side rests on the upper side of the movably driven conveyor belts 26.

It is shown that in a first step, the telescopic arms 25 are initially pushed out parallel to each other in the direction of arrows 31, so as to expel the loaded multi-compartment container 1 in the direction of the arrow from the loading space 33 laterally to the right.

Such a partial unloading position is shown in FIG. 21, where it may be seen that the right transverse wall 3 is at position 40, and the abutment 39 over an unloading hopper 35 has not yet been reached.

At position 40, the displacement drive for the telescopic arms 25 is stopped, and to achieve the complete unloading position of FIG. 22, the drive for the conveyor belts 26 is now turned on so as to bring the right transverse wall 3 of the multi-compartment container 1 from the position 40 in the final unloading position with the transverse wall 3 abutting against the fixed abutment 39.

In FIG. 21 it is also shown that the opening of all the opening lids 6 is blocked by the respective telescopic arm 25 having moved under the opening lids 6 and preventing the opening thereof.

FIG. 22 shows the initial unloading position. It is shown that when retracting the telescopic arms 25 in the direction of arrow 31' the telescopic head 27 initially releases the foremost opening lid 6a, because the support of the telescopic arm 25 for this opening lid 6a has been eliminated according to FIG. 21.

Only the retraction of the telescopic arm 25 in the direction of arrow 31 according to FIG. 22 sequentially releases the opening lids 6a-6f and thus pivots the same into their open position so as to empty either only compartment 14b or subsequently also compartment 14a. If more than two compartments are provided, then these are successively emptied during the retraction of the telescopic arms 25.

In the embodiment shown, only a partial opening of the compartment 14b is shown, and for complete emptying of the compartment 14b the telescopic arm 25 should be retracted with its telescopic head 27 to the position 41, so as to open all opening lids 6a associated with the compartment 14b, and thus letting the bulk material contained within the compartment 14b flow unmixed into the unloading hopper 35.

The unloading hopper 35 consists of inclined walls 36, which conically converge into an underlying fall tube 37.

FIG. 23 shows as a modified embodiment, compared to FIG. 22, in that a separation wall 13 is omitted and that the entire multi-compartment container consists of a single compartment, which is filled with an unmixed bulk material. Therefore, upon complete retraction of the telescopic arm 25 in the position shown in FIG. 23 successively all the opening lids 6a-6f are opened, and thus the bulk material 18 will flow as the only contents of the single compartment in the direction of arrow 19 from the now open bottom wall 5 of the multi-compartment container 1 into the fall tube 37.

With the modification of the embodiment of FIGS. 22 and 23, it becomes clear that in the internal space 8 of the multi-compartment container 1, a plurality of separation walls 13 may be arranged, and each separation wall, together with one or more bottom-side opening lids respectively forms a compartment 14a, 14b etc. The various configuration options result from the description of the exemplary embodiment according to FIG. 5 and the resulting further possibilities (matrix arrangement of compartments 14), etc.

In this way, any number of compartments 14, 14a, 14b may be arranged in the inner space 8 of a multi-compartment container, and each compartment is then filled with a specific bulk material. It is not necessary for the solution if a compartment extends from one longitudinal wall 2 to the other longitudinal wall 2. On the basis of the description relating to FIG. 5 it may be noted that additional transverse separating compartments may be provided which intersect the one or more separation compartments 13 at an angle of 90 degrees and thereby form a matrix-like subdivision of the compartments 14.

The number of separation compartments and of the subdividing transversal compartments is therefore unlimited. It may be possible to provide no separation wall or any number of separation walls 13.

In the embodiment of FIG. 24, the top view is shown on a rail track 42, in which an unloading station 44 is arranged according to the embodiment of FIGS. 22 and 23 in the upper region, wherein on the opposite side a filling station 45 is provided.

With reference to FIG. 23 it should also be noted that the unloading hopper 35 rests on a support profile 43 which is mounted on the rail track and fixed to the housing. The support profile is also shown in FIG. 24.

Starting from a filling station 45 in FIG. 24, first a middle container 48 is filled with a bulk material 18 via a filling tube 47 and is then brought to the left into a parking position in which the container 48' is waiting to be taken and loaded by a transport robot 20.

The loading operation takes place in the opposite direction of the description of FIGS. 20 to 23.

Conversely, in FIG. 24 an empty container is unloaded by the transport robot 20 as an empty container 46 in the indicated arrow direction 49 and conveyed to the center station for filling with the filling tube 47.

In the waiting position in the region of the filling station 45, the support profiles 43 are configured so that all the opening lids 6 are engaged from below, in order to avoid that the filled multi-compartment container unintentionally opens in the filling station 45.

When loading the filled container 48' in the direction of arrow 49', the telescopic arms 25 engage under the respective opening lids 6 and keep them closed to prevent them from being emptied on the transport robot 20 during the loading process.

FIG. 26 shows a section in the direction of arrow D-D according to FIG. 25, in order to explain the operation of an unloading station 44.

In FIG. 26 the telescoping arm 25 engages laterally below the respective opening lid 6 in order to prevent its arbitrary opening.

The respective telescopic arm 25 moves into the hollow profile 55 of the support profile 43, which is also shown in FIG. 27.

With the driving in of the telescopic arm 25 in the hollow section 55, the multi-compartment container 1 is raised and the original parking position according to FIG. 27, in which the opening lids 6 rest on the top of the hollow profile 55, is left. The multi-compartment container 1 is placed on top of the telescopic arm 25 and moved further by means of the circulating driven conveyor belts 26 arranged therein.

This is also shown in FIG. 27. FIG. 27 shows the parking position of a multi-compartment container in a rack system 51. The hollow profile 55 is also arranged in the area of the unloading station 44 in the area of the rack system.

Thus, in the parking position, the closed opening lids 6 are fully seated on the upper sides of the shelves 53 as a part of the hollow profile 55 and are thus protected against an involuntary opening.

Only when they are lifted by the telescopic arms 25 in the direction of arrow 56, they are loaded on top of each telescopic arm 25, as shown in FIG. 26. By driving the conveyor belts 26, they are completely pulled on the telescopic arm 25. Therefore, they are also protected against unintentional opening when pulled on the telescopic arms 25.

The rack system 51 forms a plurality of storage spaces 52, in which the multi-compartment container 1 may be arranged in an arrangement parallel to the transport plane of the expulsion track 50. However, they may also be stacked vertically one above the other.

Instead of the exemplary expulsion track 50 shown, other and/or multiple expulsion and insertion tracks may be used.

An expulsion track is associated with a rail 54 which is flush with the rail 24 of the rail track 42.

FIG. 29 shows, in an exemplary embodiment, a storage table 58 on which a plurality of collection containers 57 are arranged, in which the respective bulk material 18 is stored in an unmixed state.

Starting from the unloading hopper 35, the fall tube 37 is guided manually and inserted into the associated receiving opening 60 of the respective collecting container 57 so as to selectively fill each collection container 57 with a particular unmixed bulk material.

Sensors 59, which are respectively arranged on the collecting container 57 determine the respective insertion position of the fall tube 37 in the receiving opening 60 of the collection container 57.

Each collection container 57 is associated to a marking label 61, which is provided with a bar code to identify the collection container 57.

Another article label 62 with a different bar code is provided to associate the nature and number of its bulk material to the collection container 57.

Instead of a manual separation of the bulk materials in different collection containers 57, in an embodiment, not shown, the fall tube 37 is mechanically and automatically driven and inserted under the control of programming commands in the associated receiving openings 60.

Instead of a manual separation of the contents into different collection containers 57 an automatic distribution may therefore also be provided.

In FIG. 30, two different displacement positions of the fall tube 37, 37' are shown, where it may be seen that the fall tube 37 according is associated to different collecting containers 57', 57" depending on its displacement position. The one collecting container 57' is connected to a filling tube 63, which fills the bulk material into a first processing machine 64.

The second collection container 57" introduces the other type of bulk material through the filling tube 63 into another processing machine 64a.

Each collecting container 57', 57" is associated to an article label 65, 65a, so as to control the sorted delivery of bulk material into different processing machines 64, 64a.

FIGS. 31 to 34 show a further embodiment with a modified transport robot 20, on which the previously mentioned telescopic arms 25, 26 are omitted, and instead a simple longitudinal conveyor 66 is present, which consists in the illustrated embodiment of a closed conveyor belt 77 which is slidably driven by non-illustrated circulating rollers.

Instead of a conveyor belt 77 extending over the entire width of the loading space 33 it is also possible to use individual transport belts which may be driven either jointly or separately, in a movable way.

These conveyor belts or transport belts may be designed as toothed belts or as V-belts.

In the exemplary embodiment shown according to FIGS. 31 to 34, the multi-compartment container 1 according to FIG. 34 received inside the loading space 33 is conveyed in the direction of arrow 71 out of the loading space 33 by driving the conveyor belt 77 and reaches a transportingly connected subsequent approach plane 67.

The basic position of the multi-compartment container is shown in FIGS. 33 and 34, while a partially expelled position is shown in FIGS. 31 and 32.

As previously shown, the bottom surface 34 of the loading space 33 is formed either by telescopic arms 25 with slidably driven conveyor belts 26, or—in the embodiment of FIGS. 31 to 37—by a single or subdivided conveyor belt 77, which forms the bottom surface 34 of the loading space 33 of the transport robot.

According to FIGS. 31 and 32, the multi-compartment container pushed out of the loading space 33 is conveyed onto the approach plane 67 and fed from there to the unloading station 44 by means of a gripper device arranged thereon.

The gripping device 70 consists in principle of a sledge guide 69, which is aligned parallel to the transport direction (arrow 71) and the slide guide 69 is connected in a manner not shown with a gripping arm 68 which is able to grasp the front face of the container 1 and to pull it over the unloading station 44.

As shown in FIGS. 31, 32 the opening lids 6a, 6b successively open with the pulling movement of the slide guide 69, so that either only the front compartment 14b and after its emptying, subsequently the compartment 14a may also be emptied completely.

The approach plane 67 is provided with an overflow edge 72 in order to ensure that the container 1 is extracted in a clean and smooth way on the plane 67 and then further gripped by the gripping arm 68 and delivered to the unloading station 44.

Naturally, the embodiment of FIGS. 31 to 34 also works in the opposite direction, namely that by means of a filling station, not shown, the container 1 is successively filled with separate bulk materials in its compartments 14a, 14b and then pushed by the gripping device 70 shown here on the transport robot 20 and its loading space 33.

The FIG. 35 shows, in comparison to FIG. 19, the same transport robot, wherein however in FIG. 19 the longitudinal conveyor 66 was designed as having driven telescopic arms 25 with conveyor belts 26 arranged thereon, while in the embodiment of FIGS. 31 to 35, the longitudinal conveyor is a simple circulating driven conveyor belt 77.

FIG. 36 shows the loading position of the transport robot with the loaded multi-compartment container 1.

FIG. 37 shows the separation of a multi-compartment container either by a transport robot 20 which is shown there only schematically or by a roller conveyor 73, which is shown in FIG. 38 as an example of such a roller conveyor.

The roller conveyor 73 shown essentially consists of a longitudinal section 74 with rotatably driven rollers, from which a transverse conveyor 75 branches off, so that starting from the transport direction in the direction of arrow 71 at a point of inflection 76 it is possible to move the multi-compartment container 1 to be loaded or unloaded on the transverse conveyor 75, to which then—as shown in FIG. 37—the approach plane 67 and then the gripping device 70 are joined.

Thus, it is clear that the invention does not only refer to rail-bound transport robots that transport multi-compartment container 1 loaded with bulk material along a rail track 42.

The invention consequently also refers to general longitudinal conveyors, which are formed, for example, by roller conveyors 73, on which multi-compartment containers 1 filled with bulk material are transported.

Instead of a roller conveyor 73, all other known longitudinal conveyors may obviously be used, which, for example, include conveyors with belt drives, roller drives and similar.

It is important that in the exemplary embodiment of FIGS. 37 and 38, it is shown in general that a rail-bound transport robot 20 may also be omitted, replacing the same with a general longitudinal conveyor 73, 74, 75.

REFERENCE LIST 1 multi-compartment container
2 longitudinal wall
3 transversal wall
4 cover profile
5 bottom wall
6 opening lid a-f
7
8 inner space
9 swivel bearing
10 locking slider
11 arrow direction
12 locking protrusion
13 separation compartment
14 compartment a, b
15 arrow direction
16 lid edge
17 bottom opening
18 bulk material 18a, 18b
19 fall direction
20 transport robot
21 housing
22 drive wheel
23 arrow direction
24 rail
25 telescopic arm 26 conveyor belt
27 telescopic head
28 support rollers
29 guide rollers
30 arrow direction (26)
31 arrow direction (25) 31'
32 side guide
33 loading space
34 bottom surface (of 33)
35 unloading hopper
36 oblique wall
37 fall tube 37'
38 arrow direction
39 abutment
40 position
41 position
42 rail track
43 support profile
44 unloading station
45 loading station
46 empty container
47 filling tube
48 container 48'
49 arrow direction 49'
50 expulsion track
51 rack system
52 deposition places
53 deposition sheet
54 track rail (in 51)
55 hollow profile
56 arrow direction
57 collection container 57', 57"
58 storage table
59 sensor
60 receiving opening
61 marking label
62 article label
63 filling tube
64 processing machine a
65 article label a
66 longitudinal conveyor
67 approach plane
68 gripping arm
69 sledge guide
70 gripping device
71 arrow direction
72 overflow edge
73 roller conveyor
74 longitudinal track
75 transversal conveyor
76 inversion point
77 conveyor belt

The invention claimed is:

1. A rail-bound transport robot comprising:
a longitudinal conveyor,
an approximately box-shaped container, having an inner space and an open top, for individual release of bulk material, which is provided in the inner space with at least one compartment configured to be filled with the bulk material, the container comprising opening lids positioned on a bottom side of the container that is opposite the open top,
a loading space having a bottom side and being open at the top, configured to receive the container, such that the container rests on the bottom side on the longitudinal conveyor, which engages an underside of the opening lids, wherein the bulk material flows outwardly through the opening lids, when the opening lids are opened,
wherein the longitudinal conveyor is composed of movably driven telescopic arms, which are arranged within the loading space of the transport robot.

2. The transport robot of claim 1, wherein the longitudinal conveyor is composed of one or more conveyor belts, which are positioned within the loading space of the transport robot.

3. The transport robot of claim 1, wherein each telescopic arm is covered by a circulating driven conveyor belt, on which the bottom side of container is resting.

4. The transport robot of claim 1, wherein the telescopic arms protect the bottom opening lids of container against an involuntary opening.

5. The transport robot of claim 1, wherein each telescopic arm has a front side and the front side of each respective telescopic arm is shaped like an approach ramp for engaging the bottom side of container, which lifts the container when engaging a support profile forming an unloading site.

6. A method for operating a rail-bound transport robot on a rail track, on which one or more unloading and filling stations for transporting bulk materials are arranged, comprising:
loading the bulk materials into containers, which are open at the top, and the containers on the transport robot are received in a loading space which is open at the top,
in a loading position, resting a bottom side of the container on a movably driven longitudinal conveyor, such that at least a part of the longitudinal conveyor is blocked by opening lids, which are arranged on the bottom side in the container and
unloading the bulk material by conveying, along the longitudinal conveyor, the transport robot on an approach plane, in a region of which an unloading station is positioned, and
in the region of the unloading station, retracting telescopic arms of the longitudinal conveyor into the transport robot and thus successively release and unlock the opening lids.

7. The method of claim 6, wherein in the region of the unloading station, conveying the longitudinal conveyor the container on an approach plane, and from there transporting the container by a gripping device to an unloading station.

8. The method of claim 6, wherein when the longitudinal conveyor is formed by movably driven telescopic arms, retracting the telescopic arms in the region of the unloading station from the bottom side of container and thus successively release and unlock the opening lids one after the other.

9. The method of claim 6, further comprising moving the telescopic arms of the transport robot along the bottom wall of the container while releasing the swivel lock of the opening lids.

10. The method of claim 6, wherein
in a first step, initially extracting the telescopic arms parallel to each other, to expel a loaded container from the loading space into a partial unloading position, laterally, onto a rail-fixed support profile,
in a second step, when reaching the partial unloading position, stopping a displacement drive for the telescopic arms,
in a third step, for reaching a final unloading position, activating a drive for the conveyor belts, to transport the container into a definitive unloading position against an abutment, which is fixed to a housing, in a fourth step, retracting the telescopic arms into the loading space and a frontal telescopic head initially releases a opening lid in a most advanced position and then, selectively releasing other opening lids one after the other.

11. The method of claim 10, wherein each of the telescopic arms travel into a hollow profile of the rail-fixed support profile, thus lifting the container and pulling the container onto a upper side of the telescopic arm by actuating the conveyor belts.

12. The method of claim 6, wherein in a first step, initially transporting a robot-side longitudinal conveyor a loaded container from the loading space onto an approach plane which is transportingly connected to a rail track, and in a second step, supplying the container deposited on the approach plane to an unloading station by a movably driven gripping device.

\* \* \* \* \*